United States Patent
Han et al.

(10) Patent No.: US 11,527,814 B2
(45) Date of Patent: Dec. 13, 2022

(54) ELECTRONIC DEVICE INCLUDING ANTENNAS

(71) Applicant: Samsung Electronics Co., Ltd., Gyeonggi-do (KR)

(72) Inventors: Junhee Han, Gyeonggi-do (KR); Heedong Kim, Gyeonggi-do (KR); Inho Shin, Gyeonggi-do (KR); Jiyoung Lim, Gyeonggi-do (KR); Yongwon Cho, Gyeonggi-do (KR); Jiwoo Lee, Gyeonggi-do (KR)

(73) Assignee: Samsung Electronics Co., Ltd.

( * ) Notice: Subject to any disclaimer, the term of this patent is extended or adjusted under 35 U.S.C. 154(b) by 55 days.

(21) Appl. No.: 17/333,243

(22) Filed: May 28, 2021

(65) Prior Publication Data

US 2021/0376453 A1 Dec. 2, 2021

(30) Foreign Application Priority Data

May 29, 2020 (KR) .................. 10-2020-0065342

(51) Int. Cl.
*H04B 1/38* (2015.01)
*H01Q 1/24* (2006.01)
(Continued)

(52) U.S. Cl.
CPC .......... *H01Q 1/243* (2013.01); *G06F 3/03545* (2013.01); *H01Q 1/02* (2013.01);
(Continued)

(58) Field of Classification Search
CPC .. H04M 1/026; H04M 1/0264; H04M 1/0266; H04M 1/02; H01Q 1/243; H01Q 1/02; H01Q 21/064
See application file for complete search history.

(56) References Cited

U.S. PATENT DOCUMENTS 10,389,007 B1 8/2019 Choi et al.
10,530,061 B2 1/2020 Chi et al.
(Continued)

FOREIGN PATENT DOCUMENTS

KR 20190076659 7/2019
WO WO 2020/040499 2/2020

OTHER PUBLICATIONS

International Search Report dated Sep. 6, 2021 issued in counterpart application No. PCT/KR2021/006542, 6 pages.

*Primary Examiner* — Tuan Pham
(74) *Attorney, Agent, or Firm* — The Farrell Law Firm, P.C.

(57) ABSTRACT

An electronic device including antennas is provided. The electronic device includes a cover window including a view area and a non-view area formed along edges of the view area and including a view portion formed in at least one area, a frame including a first structure and a second structure which at least one electronic component is disposed, one surface of the first structure, forming the rear surface of the electronic device, including a nonconductive area including a window area and a conductive area surrounding the nonconductive area, a display, a PCB disposed in the second structure, wireless communication circuitry disposed on the printed circuit board, a first camera disposed in an area corresponding to the view portion of the second structure, a second camera disposed in an area of the second structure corresponding to the window area, a first antenna module configured to generate a first RF signal toward the cover window, and a second antenna module configured to generate a second RF signal toward the rear surface of the electronic device.

20 Claims, 27 Drawing Sheets

(51) Int. Cl.
  *H04M 1/02* (2006.01)
  *H01Q 21/06* (2006.01)
  *H01Q 1/02* (2006.01)
  *G06F 3/0354* (2013.01)
(52) U.S. Cl.
  CPC ........ *H01Q 21/064* (2013.01); *H04M 1/0264* (2013.01); *H04M 1/0266* (2013.01); *H04M 2250/52* (2013.01)

(56) References Cited

U.S. PATENT DOCUMENTS

| | | |
|---|---|---|
| 2019/0165472 A1 | 5/2019 | Yun et al. |
| 2019/0229403 A1 | 7/2019 | Yong et al. |
| 2019/0393911 A1 | 12/2019 | Hawaka |
| 2020/0168977 A1 | 5/2020 | Son et al. |
| 2020/0220954 A1* | 7/2020 | Hebert ................ H04M 1/0266 |
| 2020/0295854 A1* | 9/2020 | Narra .................... H04B 17/327 |
| 2020/0310489 A1* | 10/2020 | Spraggs ............... H04N 5/2257 |

\* cited by examiner

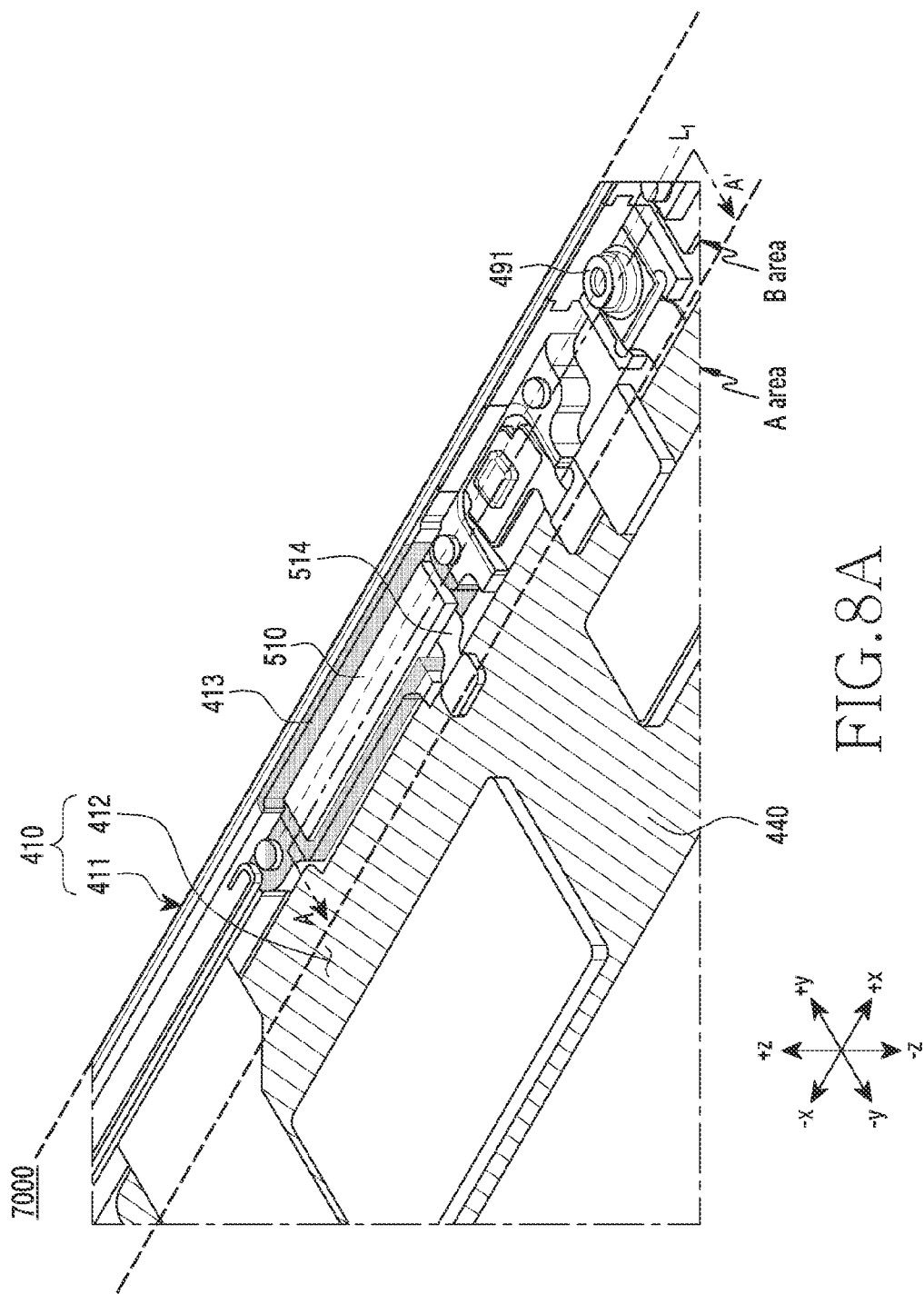

ELECTRONIC DEVICE INCLUDING ANTENNAS

CROSS-REFERENCE TO RELATED APPLICATION(S)

This application is based on and claims priority under 35 U.S.C. § 119 to Korean Patent Application No. 10-2020-0065342, filed on May 29, 2020, in the Korean Intellectual Property Office, the entire disclosure of which is incorporated herein by reference.

BACKGROUND

1. Field

Various embodiments of the disclosure relate to an electronic device including antennas.

2. Related Art

With development of wireless communication technology, an electronic device (e.g., a communication electronic device) is widely used in daily life, and accordingly, use of content is increasing exponentially. In addition, due to the rapid increase in the use of the content, demand for wireless traffic also rapidly increases, and thus, a user demand for faster data communication gradually increases.

To satisfy the growing user demand for high-speed data communication, more electronic devices support a next-generation wireless communication technology (e.g., 5th generation (5G) communication) using millimeter wave (mmWave) over about 20 GHz or a high-speed wireless communication technology such as wireless gigabit alliance (WIGig) (e.g., 802.11AD).

Since a next-generation wireless communication technology mostly uses a millimeter wave (mmWave) frequency band (e.g., about 28 GHz and/or about 39 GHz) substantially over about 20 GHz, free space loss may be caused by high frequency characteristics.

More electronic devices are using a mmWave antenna (or an array antenna) including a plurality of antenna elements at designated intervals to reduce the free space loss and to raise antenna performance (e.g., antenna gain).

The mmWave antenna performance may improve as the number of the antenna elements increases, whereas a whole volume of the mmWave antenna increases. Hence, it may be difficult to obtain a space for mounting the mmWave antenna inside the electronic device.

To obtain the space for mounting the mmWave antenna inside the electronic device, a mmWave antenna may be disposed in parallel with a rear plate (or a rear case) to face a rear surface of the electronic device (hereinafter, parallel mounting), or vertically to the rear plate to face a side surface of the electronic device (hereinafter, vertical mounting).

However, if the mmWave antenna is horizontally mounted and/or vertically mounted, it is necessary to dispose a plurality of mmWave antennas in a left side and/or a right side of the electronic device to form a beam pattern toward a front surface of the electronic device, which may increase a manufacturing cost of the electronic device.

In addition, the above-described methods often form the rear plate with a nonconductive material to mitigate antenna performance degradation due to a conductive material (e.g., a metal) of the electronic device, or form some area of a frame which forms the side surface of the electronic device with a nonconductive material. However, if only the rear surface or some area of the side surface of the electronic device is formed with the nonconductive material in the electronic device of which the side surface and the rear surface are integrated, a total thickness of the electronic device increases, making it difficult to apply the above-described mmWave antenna structure to an electronic device in which the side surface and the rear surface are integrated.

Hence, a need exists for a mmWave antenna structure for achieving a thin electronic device and obtaining a space for the mmWave antenna structure for use in an electronic device in which the side surface and the rear surface are integrated.

SUMMARY

Accordingly, this disclosure is provided to address at least the problems and/or disadvantages described above and to provide at least the advantages described below.

An aspect of the disclosure is to provide an electronic device including a mmWave antenna module horizontally aligned with a front camera of the electronic device and/or a mmWave antenna module horizontally aligned with a rear camera of the electronic device. In accordance with an aspect of the disclosure, an electronic device is provided, which includes a cover window that forms a front surface of the electronic device, the cover window comprising a view area and a non-view area formed along edges of the view area, and a view portion formed in at least one area of the non-view area; a frame comprising a first structure that forms a sides surface and a rear surface of the electronic device, and a second structure on which at least one electronic component is disposed, the first structure including a surface that forms the rear surface of the electronic device, the surface including a nonconductive area that includes a window area and a conductive area that surrounds the nonconductive area; a display visually exposed to outside of the electronic device through the view area of the cover window; a printed circuit board disposed in the second structure; wireless communication circuitry disposed on the printed circuit board; a first camera disposed in a first area of the second structure corresponding to the view portion, and facing the cover window; a second camera disposed in a second area of the second structure corresponding to the window area, and facing the rear surface of the electronic device; a first antenna module electrically connected with the wireless communication circuitry, and configured to generate a first radio frequency (RF) signal toward the cover window; and a second antenna module electrically connected with the wireless communication circuitry, and configured to generate a second RF signal toward the rear surface of the electronic device. The first antenna module and the first camera are aligned on a first axis, and the second antenna module and the second camera are aligned on a second axis.

In accordance with another aspect of the disclosure, an electronic device is provided, which includes a cover window that forms a front surface of the electronic device, the cover window comprising a view area and a non-view area formed along edges of the view area, and a view portion formed in at least one area of the non-view area; a frame comprising a first structure that forms a side surface and a rear surface of the electronic device, and a second structure on which at least one electronic component is disposed, the first structure of the frame including one surface that forms the rear surface of the electronic device, the one surface including a window area and a recess comprising at least one slot; a nonconductive plate disposed in the recess and forming at least part of the rear surface of the electronic device; a display visually exposed to outside of the electronic device through the view area of the cover window; a printed circuit board (PCB) disposed in the second structure; wireless communication circuitry disposed on the printed circuit board; a first camera disposed in a first area of the second structure corresponding to the view portion, and facing the cover window; a second camera disposed in a second area of the second structure corresponding to the window a rea, and facing the rear surface of the electronic device; a first antenna module electrically connected with the wireless communication circuitry, and configured to generate a first radio frequency (RF) signal toward the cover window; and a second antenna module electrically connected with the wireless communication circuitry, and configured to generate a second RF signal toward the rear surface of the electronic device. The first antenna module and the first camera are aligned on a first axis, and the second antenna module and the second camera are aligned on a second axis.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 8A illustrates an inside of the electronic device of FIG. 7 viewed from the front surface view according to an embodiment;

DETAILED DESCRIPTION

Various embodiments of the disclosure will now be described in detail with reference to the accompanying drawings. In the following description, specific details such as detailed configuration and components are merely provided to assist the overall understanding of these embodiments of the disclosure. Therefore, it should be apparent to those skilled in the art that various changes and modifications of the embodiments described herein can be made without departing from the scope and spirit of the disclosure. In addition, descriptions of well-known functions and constructions are omitted for clarity and conciseness.

Figure 1:
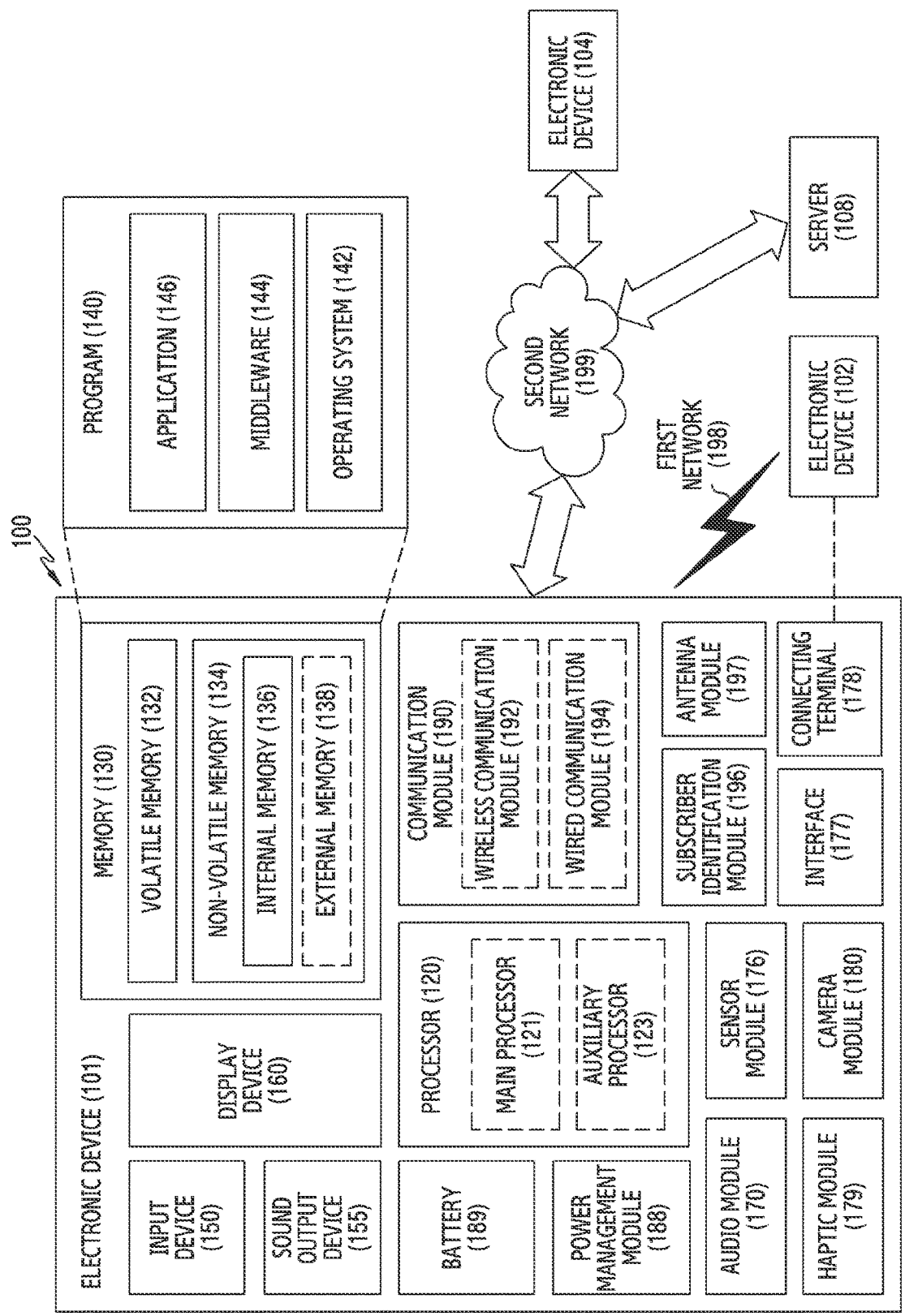
FIG. 1 illustrates an electronic device in a network environment according to an embodiment.

FIG. 1 illustrates an electronic device 101 in a network environment 100 according to an embodiment.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an ISP or a CP) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, ISPs, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a $4^{th}$ generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beamforming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
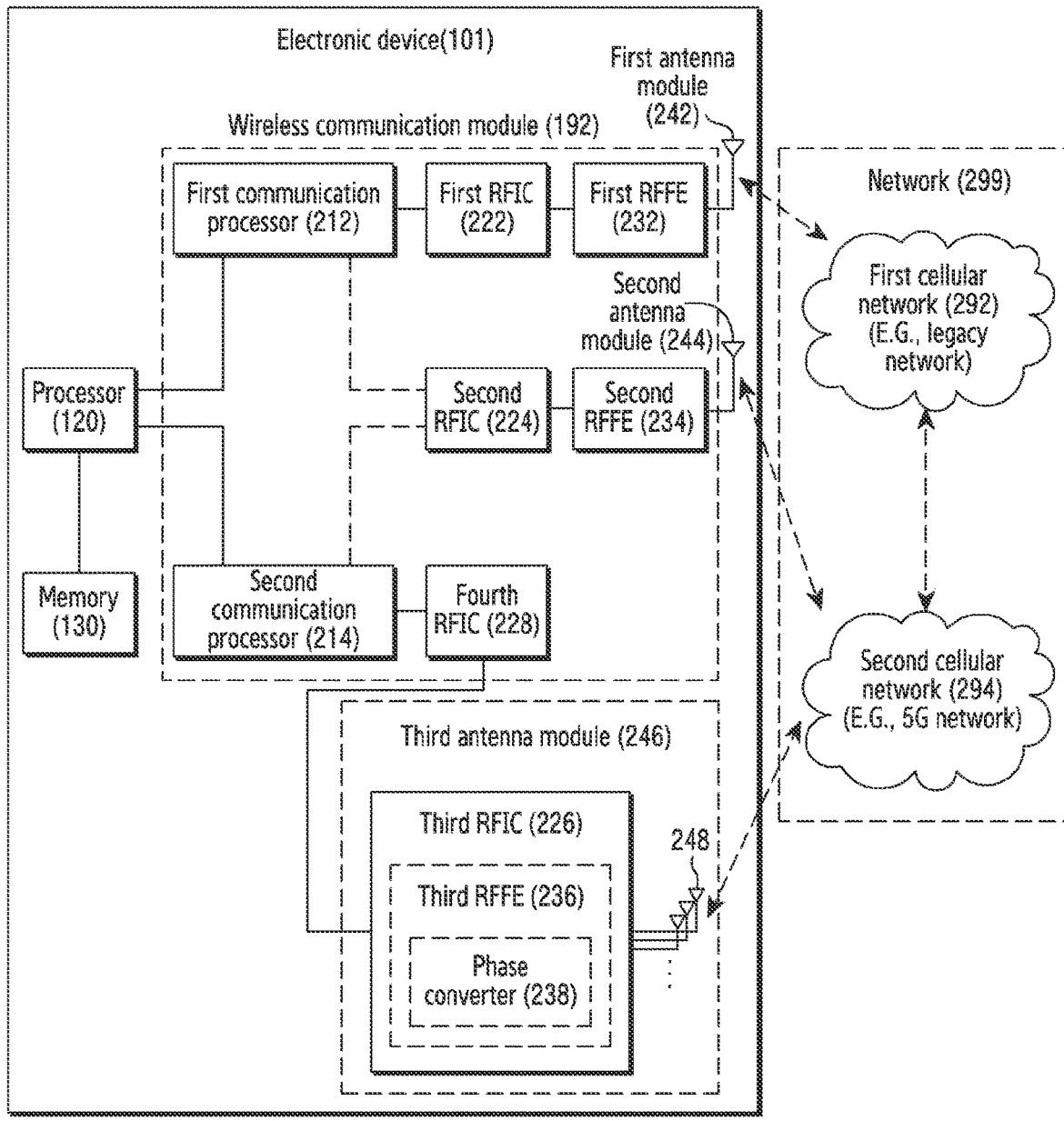
FIG. 2 illustrates an electronic device in a network environment including a plurality of cellular networks according to an embodiment.

FIG. 2 illustrates an electronic device in a network environment including a plurality of cellular networks according to an embodiment.

Referring to FIG. 2, an electronic device 101 includes a first CP (e.g., including processing circuitry) 212, a second CP (e.g., including processing circuitry) 214, a first RFIC 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 further includes a processor (e.g., including processing circuitry) 120 and a memory 130. The second network 199 includes a first cellular network 292 and a second cellular network 294. Alternatively, the electronic device may include at least one of the parts illustrated in FIG. 1 and the second network 199 may further include at least one another network. The first CP 212, the second CP 214, the first RFIC 222, the second RFIC 224, the fourth RFIC 228, the first RFFE 232, and the second RFFE 234 may form at least a portion of a wireless communication module 192. The fourth RFIC 228 may be omitted or may be included as a portion of the third RFIC 226.

The first CP 212 can support establishment of a communication channel with a band to be used for wireless communication with the first cellular network 292 and legacy network communication through the established communication channel. The first cellular network may be a legacy network including a $2^{nd}$ generation (2G), $3^{rd}$ generation (3G), 4G, or Long-Term Evolution (LTE) network. The second CP 214 can support establishment of a communication channel corresponding to a designated band (e.g., about 6 GHz~about 60 GHz) of a band to be used for wireless communication with the second cellular network 294 and 5G network communication through the established communication channel. The second cellular network 294 may be a 5G network that is defined in 3' generation partnership project (3GPP). Further, the first CP 212 or the second CP 214 can support establishment of a communication channel corresponding to another designated band (e.g., about 6 GHz or less) of a band to be used for wireless communication with the second cellular network 294 and 5G network communication through the established communication channel. The first CP 212 and the second CP 214 may be implemented in a single chip or a single package. The first CP 212 or the second CP 214 may be disposed in a single chip or a single package together with the processor 120, the auxiliary processor 123, or the communication module 190. The first CP 212 and the second CP 214 is directly or indirectly connected by an interface, thereby being able to provide or receive data or control signal in one direction or two directions.

The first RFIC 222, in transmission, can converts a baseband signal generated by the first CP 212 into a radio frequency (RF) signal of about 700 MHz to about 3 GHz that is used for the first cellular network 292 (e.g., a legacy network). In reception, an RF signal can be obtained from the first cellular network 292 (e.g., a legacy network) through an antenna (e.g., the first antenna module 242) and can be preprocessed through an RFFE (e.g., the first RFFE 232). The first RFIC 222 can covert the preprocessed RF signal into a baseband signal so that the preprocessed RF signal can be processed by the first CP 212.

The second RFIC 224 can convert a baseband signal generated by the first CP 212 or the second CP 214 into an RF signal in a Sub6 band (e.g., about 6 GHz or less) (hereafter, 5G Sub6 RF signal) that is used for the second cellular network 294 (e.g., a 5G network). In reception, a 5G Sub6 RF signal can be obtained from the second cellular network 294 (e.g., a 5G network) through an antenna (e.g., the second antenna module 244) and can be preprocessed through an RFFE (e.g., the second RFFE 234). The second RFIC 224 can convert the processed 5G Sub6 RF signal into a baseband signal so that the processed 5G Sub6 RF signal can be processed by a corresponding CP of the first CP 212 or the second CP 214.

The third RFIC 226 can convert a baseband signal generated by the second CP 214 into an RF signal in a 5G Above6 band (e.g., about 6 GHz~about 60 GHz) (hereafter, 5G Above6 RF signal) that is used for the second cellular network 294 (e.g., a 5G network). In reception, a 5G Above6 RF signal can be obtained from the second cellular network 294 (e.g., a 5G network) through an antenna (e.g., the antenna 248) and can be preprocessed through the third RFFE 236. The third RFIC 226 can covert the preprocessed 5G Above6 RF signal into a baseband signal so that the preprocessed 5G Above6 RF signal can be processed by the first CP 214. The third RFFE 236 may be provided as a portion of the third RFIC 226.

The electronic device 101 may include a fourth RFIC 228 separately from or as at least a portion of the third RFIC 226. In this case, the fourth RFIC 228 can convert a baseband signal generated by the second CP 214 into an RF signal in an intermediate frequency (IF) band (e.g., about 9 GHz-~about 11 GHz) (hereafter, IF signal), and then transmit the IF signal to the third RFIC 226. The third RFIC 226 can convert the IF signal into a 5G Above6 RF signal. In reception, a 5G Above6 RF signal can be received from the second cellular network 294 (e.g., a 5G network) through an antenna (e.g., the antenna 248) and can be converted into an IF signal by the third RFIC 226. The fourth RFIC 228 can covert the IF signal into a baseband signal so that IF signal can be processed by the second CP 214.

The first RFIC 222 and the second RFIC 224 may be implemented as at least a portion of a single chip or a single package. The first RFFE 232 and the second RFFE 234 may be implemented as at least a portion of a single chip or a single package. At least one of the first antenna module 242 or the second antenna module 244 may be omitted, or may be combined with another antenna module and can process RF signals in a plurality of bands.

The third RFIC 226 and the antenna 248 may be disposed on a substrate, thereby being able to form a third antenna module 246. For example, the wireless communication module 192 or the processor 120 may be disposed on a first substrate (e.g., a main PCB). In this case, the third RFIC 226 may be disposed in a partial area (e.g., the bottom) and the antenna 248 may be disposed in another partial area (e.g., the top) of a second substrate (e.g., a sub PCB) that is different from the first substrate, thereby being able to form the third antenna module 246. By disposing the third RFIC 226 and the antenna 248 on the same substrate, it is possible to reduce the length of the transmission line therebetween. Accordingly, it is possible to reduce a loss (e.g., attenuation) of a signal in a high-frequency band (e.g., about 6 GHz-~about 60 GHz), for example, which is used for 5G network communication, due to a transmission line. Accordingly, the electronic device 101 can improve the quality and the speed of communication with the second cellular network 294 (e.g., 5G network).

The antenna 248 may be an antenna array including a plurality of antenna elements that can be used for beamforming. In this case, the third RFIC 226, for example, as a portion of the third RFFE 236, may include a plurality of phase shifters 238 corresponding to the antenna elements. In transmission, the phase shifters 238 can convert the phase of a 5G Above6 RF signal to be transmitted to the outside of the electronic device 101 (e.g., to a base station of a 5G network) through the respectively corresponding antenna elements. In reception, the phase shifters 238 can convert the phase of a 5G Above6 RF signal received from the outside through the respectively corresponding antenna element into the same or substantially the same phase. This allows for transmission or reception through beamforming between the electronic device 101 and the outside.

The second cellular network 294 (e.g., a 5G network) may be operated independently from (e.g., Stand-Alone (SA)) or connected and operated with (e.g., Non-Stand Alone (NSA)) the first cellular network 292 (e.g., a legacy network). For example, there may be only an access network (e.g., a 5G radio access network (RAN) or a next generation RAN (NG RAN)) and there is no core network (e.g., a next generation core (NGC)) in a 5G network. In this case, the electronic device 101 can access the access network of the 5G network and then can access an external network (e.g., the Internet) under control by the core network (e.g., an evolved packed core (EPC)) of the legacy network. Protocol information (e.g., LTE protocol information) for communication with a legacy network or protocol information (e.g., NR protocol information) for communication with a 5G network may be stored in the memory 230 and accessed by another part (e.g., the processor 120, the first CP 212, or the second CP 214).

Figure 3A:
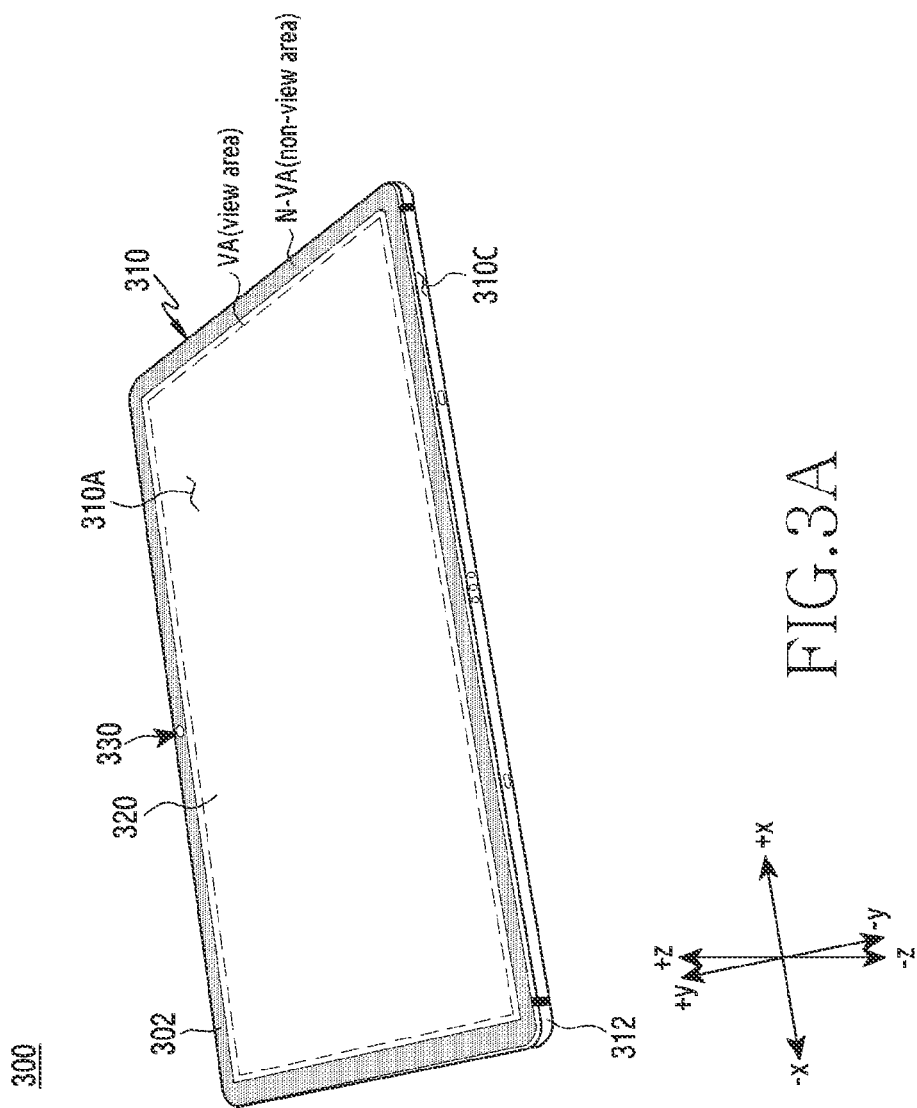
FIG. 3A illustrates a front surface of an electronic device according to an embodiment.
Figure 3B:
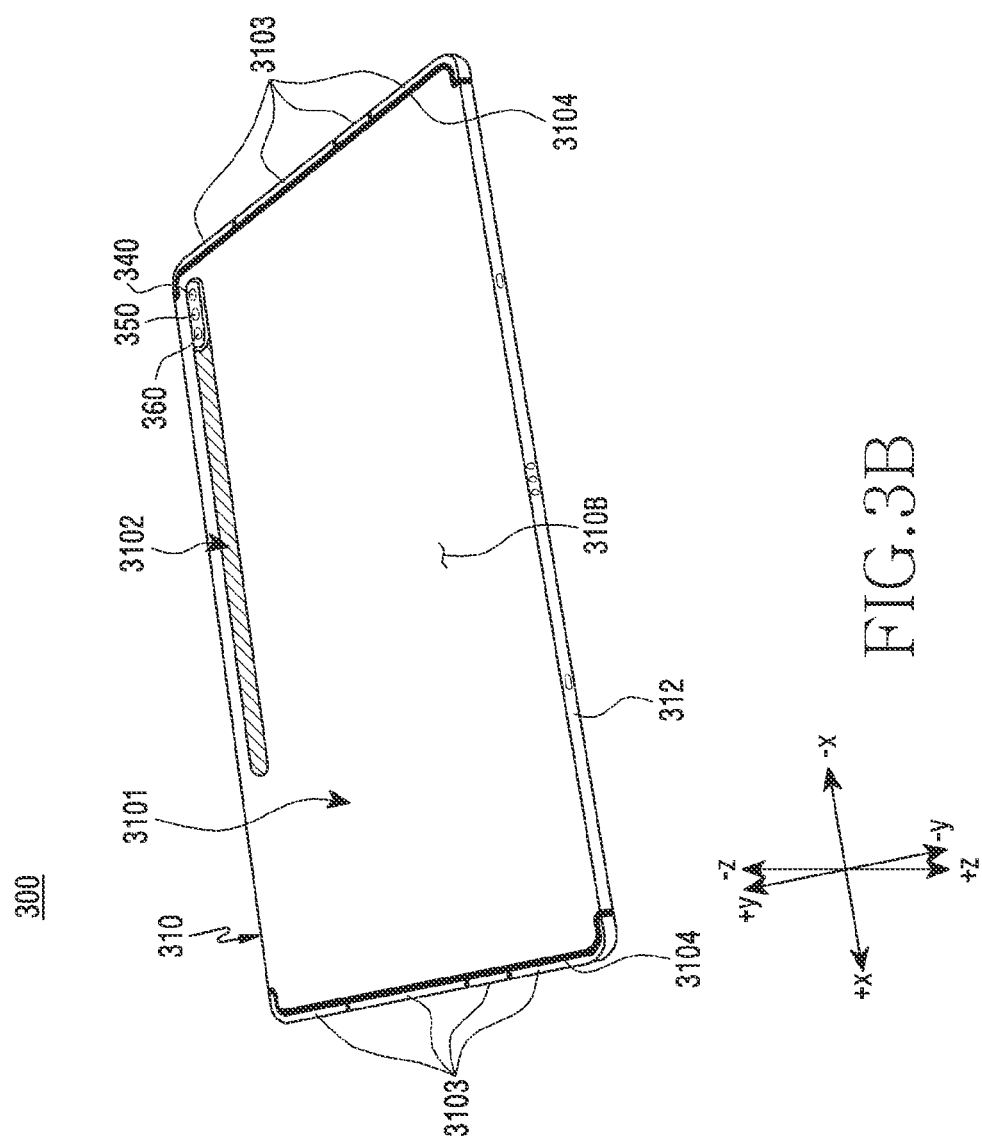
FIG. 3B illustrates a rear surface of an electronic device according to an embodiment.

FIG. 3A illustrates a front surface of an electronic device according to an embodiment, and FIG. 3B illustrates a rear surface of the electronic device according to an embodiment.

Referring to FIGS. 3A and 3B, an electronic device 300 includes a housing 310, which includes a first surface (or a front surface) 310A, a second surface (or a rear surface) 310B, and a side surface (or a side wall) 310C surrounding a space between the first surface 310A and the second surface 310B. Alternatively, the housing may refer to a structure which forms any part of the first surface 310A, the second surface 310B and/or the side surface 310C.

The first surface 310A may be formed by a cover window 302 (e.g., a glass plate including various coating layers, or a polymer plate) which is substantially transparent at least in part. The cover window 302 may include a view area (VA) which is substantially transparent and/or a non-view area (N-VA) disposed to surround edges of the VA. The N-VA may be formed through a printing layer (or a black matrix (BM)) of a rear surface of the cover window 302, and the N-VA may be viewed in block from outside of the electronic device 300. The N-VA may be formed by opaquely coating one area of the cover window 302, or by coloring it with an opaque color.

The second surface 310B and the side surface 310C may be formed by a substantially opaque frame 312. For example, the frame 312 may be coupled with the cover window 302 which forms the first surface 310A, thus forming the first surface 310A, the second surface 310B and/or the side surface 310C of the electronic device 300. The frame 312 may include a conductive material (e.g., aluminum, stainless steel (STS), or magnesium) and/or a nonconductive material (e.g., a polymer). The second surface 310B includes a conductive area 3101 formed with a conductive material and/or a nonconductive area 3102 formed with a nonconductive material. The second surface 310B may include a plurality of conductive portions 3103 and/or a plurality of nonconductive portions 3104 which segment the conductive portions 3103. The second surface 310B and the side surface 310C may be formed individually in their separate configuration. For example, the second surface 310B may be formed by a rear plate, and the side surface 310C may be formed by a side surface bezel structure.

The electronic device 300 may include at least one or more of a display 320, an audio module, camera modules 330 through 360, a key input device or a connector hole. Additionally, at least one of these components (e.g., the key input device) may be omitted from the electronic device 300 may omit, and/or the electronic device 300 may further include other components.

The display 320 may be disposed on the rear surface of the cover window 302. For example, some area of the display 320 may be visually exposed to outside of the electronic device 300 through the VA of the cover window 302, or the rest of the areas of the display 320 may be covered by the N-VA of the cover window 302 and may not be viewed from the outside of the electronic device 300. The display 320 may include an active area for displaying data if the display 320 is activated and/or an inactive area formed along at least one edge of the active area. The active area of the display 320 may be positioned in an area corresponding to the VA of the cover window 302, and visually exposed to the outside of the electronic device 300 through the VA. The inactive area of the display 320 may be positioned in an area corresponding to the N-VA of the cover window 302, and may not be viewed from the outside of the electronic device 300.

The display 320 may be coupled with, or disposed adjacent to a touch sensing circuit, a pressure sensor for measuring a touch level (pressure), and/or a digitizer for detecting a stylus pen of a magnetic type.

The audio module may include a microphone hole and a speaker hole. The microphone hole may include a microphone therein to acquire an external sound, and may include a plurality of microphones to detect a sound direction.

The speaker hole may include a plurality of external speaker holes disposed in at least one area of the side surface 310C of the housing. For example, the speaker hole may include four external speaker holes, but the number of the external speaker holes is not limited thereto. The speaker hole and the microphone hole may be implemented as a single hole, or a speaker (e.g., a piezo speaker) may be included without a speaker hole.

The electronic device 300, including a sensor module, may generate an electric signal or a data value corresponding to an internal operation state or an external environment state. The sensor module may include at least one of a proximity sensor and/or an illuminance sensor disposed in the first surface 310A of the housing 310, a fingerprint sensor (e.g., an optical fingerprint sensor or an ultrasonic fingerprint sensor) disposed in the rear surface of the display 320 or a biometric sensor (e.g., a heart rate monitor (HRM) sensor) disposed in the second surface 310B of the housing 310. The sensor module may include a first illuminance sensor disposed in one edge of the first surface 310A, a second illuminance sensor disposed in other edge perpendicular to the one edge, and/or a proximity sensor. The fingerprint sensor disposed in the rear surface of the display 320 may include an optical fingerprint sensor and/or an ultrasonic fingerprint sensor. The electronic device 300 may further include a sensor module, such as a gesture sensor (e.g., an ultrasonic sensor for gesture recognition), a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor.

The camera modules 330 through 360 may include the first camera 330 (or a front camera) disposed in the first surface 310A of the electronic device 300, the second camera 340 (or a first rear camera) disposed in the second surface 310B of the electronic device 300, the third camera 350 (or a second rear camera) and/or the flash 360 disposed in proximity to the second camera 340 and/or the third camera 350 disposed in the second surface 310B of the electronic device 300. The first camera 330 may be disposed in the rear surface of the N-VA of the cover window 302. At least part of the first camera 330 (e.g., a lens unit of the first camera 330) may be viewed in the first surface 310A of the electronic device 300 through a view portion of the N-VA. The view portion may indicate one area of the N-VA formed with a transparent material. The second camera 340, the third camera 350 and/or the flash 360 may be disposed in the nonconductive area 3102 of the second surface 310B. For example, at least part of the second camera 340, the third camera 350 and/or the flash 360 (e.g., one area of the second camera 340, the third camera 350 and/or the flash 360) may be viewed in the second surface 310B of the electronic device 300 through a window area of the nonconductive area 3102.

The first camera 330, the second camera 340, and/or the third camera 350 may include at least one or more lenses, an image sensor and/or an ISP. The camera modules 330 through 360 may include a plurality of camera modules, and perform a multi-camera function for normal photography, wide-angle photography, close-up photography, telephotography and/or extreme wide-angle photography. The camera modules 330 through 360 may further include or be replaced by a time of flight (TOF) camera and/or a light detection and ranging (LiDAR) scanner. The flash 360 may include at least one of a light emitting diode (LED) or a xenon lamp.

The key input device may be disposed in the side surface 310C of the housing 310. At least part or all of the key input device may be omitted from the electronic device 300. For example, key inputs may be implemented in a different form (e.g., using a soft key on the display 320).

The connector hole may receive a connector for transmitting and receiving power and/or data to and from an external electronic device, and/or a connector for transmitting and receiving an audio signal to and from the external electronic device. The connector hole may include a USB connector or an earphone jack.

While the electronic device 300 in FIGS. 3A and 3B is a tablet electronic device, the electronic device 300 is not limited to this embodiment. The electronic device 300 may be a foldable electronic device for switching to a folded state and a flat state (or an unfolded state) or a rollable or slidable electronic device for switching to an open state and a closed state.

Similarly, although a tablet electronic device is described in various embodiments of the disclosure below, the embodiments of the disclosure are not limited to this specific type of electronic device and may be applied to a rollable electronic device, a slidable electronic device, etc.

Figure 4:
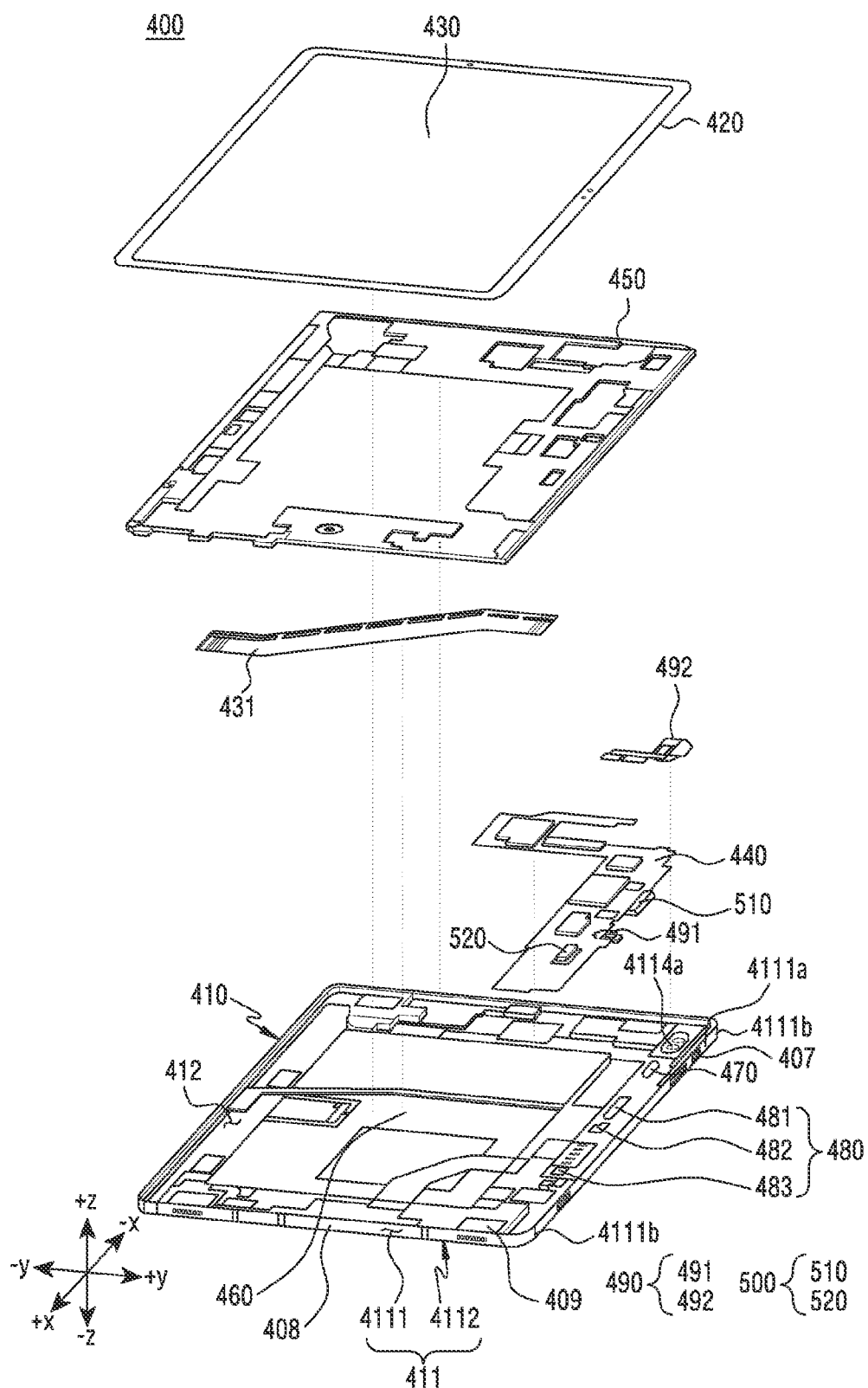
FIG. 4 illustrates an exploded view of an electronic device according to an embodiment.

FIG. 4 illustrates an exploded view of an electronic device according to an embodiment.

Referring to FIG. 4, an electronic device 400 includes a frame 410, a cover window 420, a display 430, a flexible PCB (FPCB) 431, a PCB 440, a support member 450, a battery 460, a wireless charging coil 470, at least one magnet 480, at least camera module 490 and at least one antenna module 500. At least one of the components of the electronic device 400 may be identical or similar to at least one of the components of the electronic device of FIG. 3A and FIG. 3B, and redundant explanations shall be omitted. At least some of the components of the electronic device 400 (e.g., the wireless charging coil 470 and/or the at least one magnet 480) may be omitted, or other components may be added.

The frame 410 includes a first structure 411 that forms a side surface and a rear surface of the electronic device 400 and/or a second structure 412 including at least one electronic component.

The first structure 411 of the frame 410 includes a first surface 4111 that forms the side surface of the electronic device 400 and/or a second surface 4112 that is integrated with the first surface 4111 and forms the rear surface of the electronic device 400. The first surface 4111 of the first structure 411 may include a conductive portion 4111a and/or a nonconductive portion 4111B (or a segment portion) disposed at one end and the other end of the conductive portion 4111a to insulate the conductive portion 4111a. The conductive portion 4111a of the first structure 411 may be electrically connected with wireless communication circuitry, to operate as an antenna radiator for transmitting and/or receiving an RF signal of a designated frequency band.

At least one area of the second structure 412 of the frame 410 may include at least one electronic component for performing various functions of the electronic device 400. For example, the PCB 440 and/or the battery 460 may be disposed on one surface (e.g., one surface in the +z direction of FIG. 4) toward the display 430 of the second structure 412. The first structure 411 of the frame 410 may be disposed to surround edges of the second structure 412. For example, the first structure 411 and the second structure 412 may be, but not limited to, integrally formed.

The display 430 may be disposed below (e.g., in the −z direction of FIG. 4) of the cover window 420, and may be visually exposed to outside of the electronic device 400 through a VA of the cover window 420. For example, the display 430 may be visible in the front surface of the electronic device 400 through the cover window 420. The display 430 may be electrically connected with the PCB 440 through the FPCB 431.

The PCB 440 may be interposed between the second structure 412 of the frame 410 and the support member 450, and the PCB 440 may include a processor, a memory, and/or an interface. The processor may include one or more of a CPU, an AP, a GPU, an ISP, a sensor hub processor, or a CP. The memory may include a volatile memory or a nonvolatile memory. For example, the interface may include an HDMI, a USB interface, an SD card interface, and/or an audio interface. The interface may electrically or physically interconnect the electronic device 400 and an external electronic device, and may include a USB connector, an SD card/multimedia card (MMC) connector, or an audio connector.

The support member 450 may be disposed on the PCB 440 (e.g., in the +z direction), and may protect electronic components (e.g., the processor, the memory, and/or the interface) disposed on the PCB 440 and/or electronic components (e.g., the wireless charging coil 470 and/or the at least one magnet 480) disposed in the second structure 412 from an external shock or a foreign substance. The display 430 may be disposed in one surface (e.g., one surface in the +z direction) of the support member 450, and the PCB 440 may be disposed in the other surface (e.g., one surface in the −z direction) of the support member 450. The support member 450 may be a plate (or an injection-molded plate) formed with a nonconductive material, or the support member 450 may be a plate (or a metal plate) formed with a conductive material (e.g., a metal). The support member 450 may be spaced from the display 430, or may be attached to at least one area of the display 430.

The battery 460 supplies power to at least one component of the electronic device 400, and may include a primary cell that is not rechargeable, a secondary cell that is rechargeable, or a fuel cell. The battery 460 may include at least one or more battery cells. The battery 460 may be a device that connects two battery cells in parallel. At least part of the battery 460 may be substantially flushed with the PCB 440. For example, at least part of the battery 460 may be disposed not to overlap the PCB 440 in one surface (e.g., one surface toward the +z direction) of the second structure 412. At least part of the battery 460 may be disposed to overlap some area of the PCB 440.

The wireless charging coil 470 is interposed between the PCB 440 and the second structure 412 of the frame 410, and may wirelessly transmit and/or receive necessary power for charging an external electronic device. The wireless charging coil 470 may transmit the power to a stylus pen which is attachable to or detachable from the rear surface of the electronic device 400.

The at least one magnet 480 may be interposed between the PCB 440 and the second structure 412 of the frame 410. The at least one magnet 480 includes a first magnet 481, a second magnet 482 and a third magnet 483. The first magnet 481, the second magnet 482, and/or the third magnet 483 may be magnetically coupled with magnets of the stylus pen, and accordingly the stylus pen may be mounted on the rear surface of the electronic device 400.

A shield member may be disposed in an area adjacent to the first magnet 481, the second magnet 482, and/or the third magnet 483. For example, the shield member may be disposed to surround the first magnet 481, the second magnet 482, and/or the third magnet 483, and thus obtain a distance between the first magnet 481 and the second magnet 482 and/or a distance between the second magnet 482 and the third magnet 483 over a designated distance. The shield member may obtain a distance between the first magnet 481 and the second magnet 482 and/or a distance between the second magnet 482 and the third magnet 483 over a designated distance, and thus reduce attraction and/or repulsion between the first magnet 481 and the second magnet 482 and/or between the second magnet 482 and the third magnet 483.

At least one of the first magnet 481, the second magnet 482, or the third magnet 483 may be an array magnet including a plurality of magnets. For example, the first magnet 481 near the wireless charging coil 470 may be an array magnet, and the first magnet 481 may prevent the stylus pen mounted in one area of the rear surface of the electronic device 400 from detaching from the electronic device 400 during the wireless charging.

While the at least one magnet 480 includes the first magnet 481, the second magnet 482, and the third magnet 483 in FIG. 4, the number of the magnets is not limited thereto. For example, the at least one magnet 480 may include one magnet or a plurality of magnets (e.g., two, four, five, etc.).

The at least one camera module 490 may be disposed in at least one area of the second structure 412 of the frame 410. The at least one camera module 490 may include a first camera module 491 and/or a second camera module 492. The first camera module 491 may be disposed toward the front surface (e.g., the +z direction) of the electronic device 400. At least part of the first camera module 491 may be visually exposed in the front surface of the electronic device 400 through some area (e.g., the view portion) of the cover window 420. The second camera module 492 may be disposed toward the rear surface (e.g., the −z direction) of the electronic device 400. At least part of the second camera module 492 (e.g., the lens unit of the camera) may be visually exposed in the rear surface of the electronic device 400 through a window area 4114*a* of the rear surface of the electronic device 400.

The at least one antenna module 500 may include a plurality of antenna elements, and may be electrically connected with the wireless communication circuitry to transmit and/or receive an RF signal of a designated frequency band. For example, the at least one antenna module 500 may transmit and/or receive an RF signal of a mmWave frequency band (e.g., about 28 GHz and/or about 39 GHz). The at least one antenna module 500 includes a first antenna module 510 and a second antenna module 520. The first antenna module 510 may be aligned in a horizontal direction (e.g., the +x direction or +y direction) based on the first camera module 491, and form a beam pattern toward the front direction (e.g., the +z direction) of the electronic device 400. The second antenna module 520 may be aligned in the horizontal direction (e.g., the +x direction or +y direction) based on the second camera module 492, and form a beam pattern toward the rear direction (e.g., the −z direction) of the electronic device 400.

Figure 5:
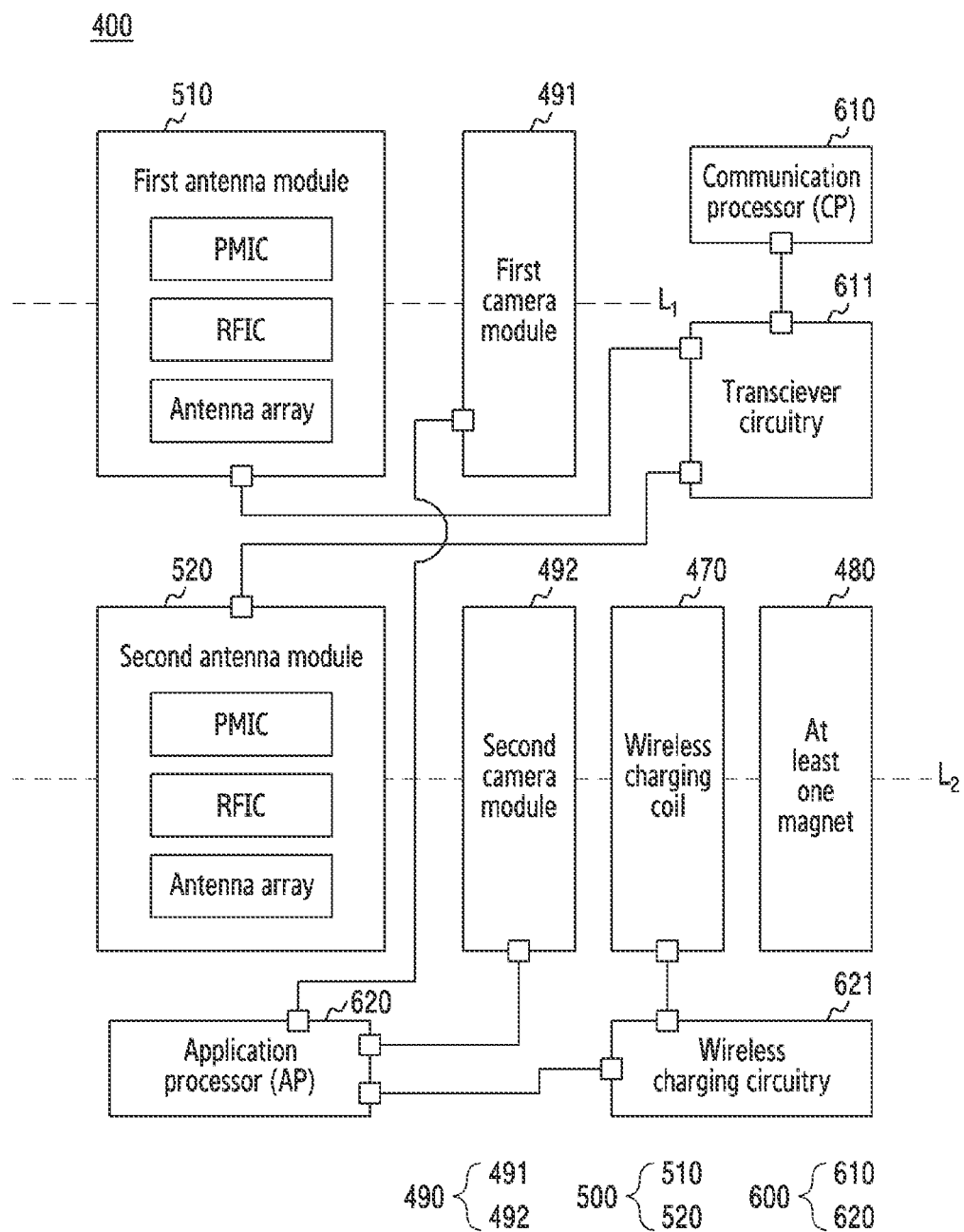
FIG. 5 illustrates electrical connections of components of an electronic device according to an embodiment.

FIG. 5 illustrates electrical connections of components of an electronic device according to an embodiment.

Referring to FIG. 5, an electronic device 400 includes a wireless charging coil 470, at least one magnet 480, a first camera module 491, a second camera module 492, at least one antenna module 500, and a processor 600.

The at least one antenna module 500 may include an antenna array, an RFIC and/or a PMIC. The antenna array may include a plurality of antenna elements disposed to form a beam pattern. The RFIC may be electrically connected with a CP 610 and/or transceiver circuitry 611, and control a frequency and/or a phase of an RF signal. The PMIC may receive voltage from a PCB, and supply necessary power to an electronic component of the first antenna module 510 and/or the second antenna module 520 (e.g., an RFIC).

The at least one antenna module 500 includes a first antenna module 510, and a second antenna module 520. The first antenna module 510 and the second camera module 491 may be aligned on a first virtual axis $L_1$ passing the first antenna module 510 and the first camera module 491. For example, the first virtual axis $L_1$ may indicate a virtual line passing at least one area of the first antenna module 510 and at least one area of the first camera module 491. The second antenna module 520 and/or the second camera module 492 may be aligned on a second virtual axis $L_2$ passing the second antenna module 520 and the second camera module 492. The second virtual axis $L_2$ may indicate a virtual line passing at least one area of the second antenna module 520 and at least one area of the second camera module 492. The wireless charging coil 470 and/or the at least one magnet 480 may be also disposed on the second virtual axis $L_2$. The first virtual axis $L_1$ and the second virtual axis $L_2$ may be in parallel. Alternatively, the first virtual axis $L_1$ and the second virtual axis $L_2$ may be the same axis, or the first virtual axis $L_1$ and the second virtual axis $L_2$ may be disposed substantially perpendicularly.

The processor 600 includes a CP 610 and/or an AP 620.

The CP 610 may be electrically connected with the first antenna module 510 and/or the second antenna module 520 through the transceiver circuitry 611. The CP 610 and/or the transceiver circuitry 611 may control the beam pattern generation of the first antenna module 510 and/or the second antenna module 520.

If the electronic device 400 transmits an RF signal to an external electronic device, the CP 610 may generate a baseband RF signal. For example, the transceiver circuitry 611 may convert the baseband RF signal generated at the CP 610 into the mmWave frequency band (e.g., about 28 GHz or about 39 GHz), and generate the beam pattern by controlling a frequency and/or a phase of the first antenna module 510 and/or the second antenna module 520 based on the modulated RF signal. If receiving an RF signal from the external electronic device, the transceiver circuitry 611 may convert the mmWave frequency band signal received from the external electronic device through the first antenna module 510 and/or the second antenna module 520 to a baseband signal to be processed at the CP 610. The transceiver circuitry 611 may convert a baseband signal to an RF signal of an intermediate frequency band (e.g., about 9 GHz through about 11 GHz) (hereafter, an IF signal) and then convert the IF signal to a mmWave frequency band signal, or convert a mmWave frequency band signal to an IF signal and then convert to a baseband signal.

The AP 620 may be electrically connected with the first camera module 491 and/or the second camera module 492, and the AP 620 may control driving of the first camera module 491 and/or the second camera module 492. The AP 620 may be electrically connected with the wireless charging coil 470 through the wireless charging circuitry 621, to detect whether a stylus pen is attached or to control driving of the wireless charging coil 470. For example, a resonance signal or an induced magnetic field signal may generate between the electronic device 400 and the stylus pen. If the stylus pen is secured to one area of the rear surface of the electronic device 400 using a magnet of the stylus pen, the electronic device 400 may receive a resonance signal or an induced magnetic field signal over a designated voltage (or a threshold voltage), and detect the attached stylus pen based on the received signal. If the stylus pen is detached from the electronic device 400, the electronic device 400 may receive a resonance signal or an induced magnetic field signal smaller than the designated voltage (or the threshold voltage), and detect the detached stylus pen based on the received signal. If the stylus pen is mounted (or attached) to the rear surface of the electronic device 400, the AP 620 may transmit and/or receive charging power and/or a communication signal including data through the wireless charging coil 470 and/or a coil of the stylus pen.

While the processor 600 is divided to the CP 610 and the AP 620 in the above-mentioned embodiment, the configuration of the processor 600 is not limited thereto. For example, the processor 600 may be configured as a single processor that integrates the CP 610 and the AP 620.

Figure 6A:
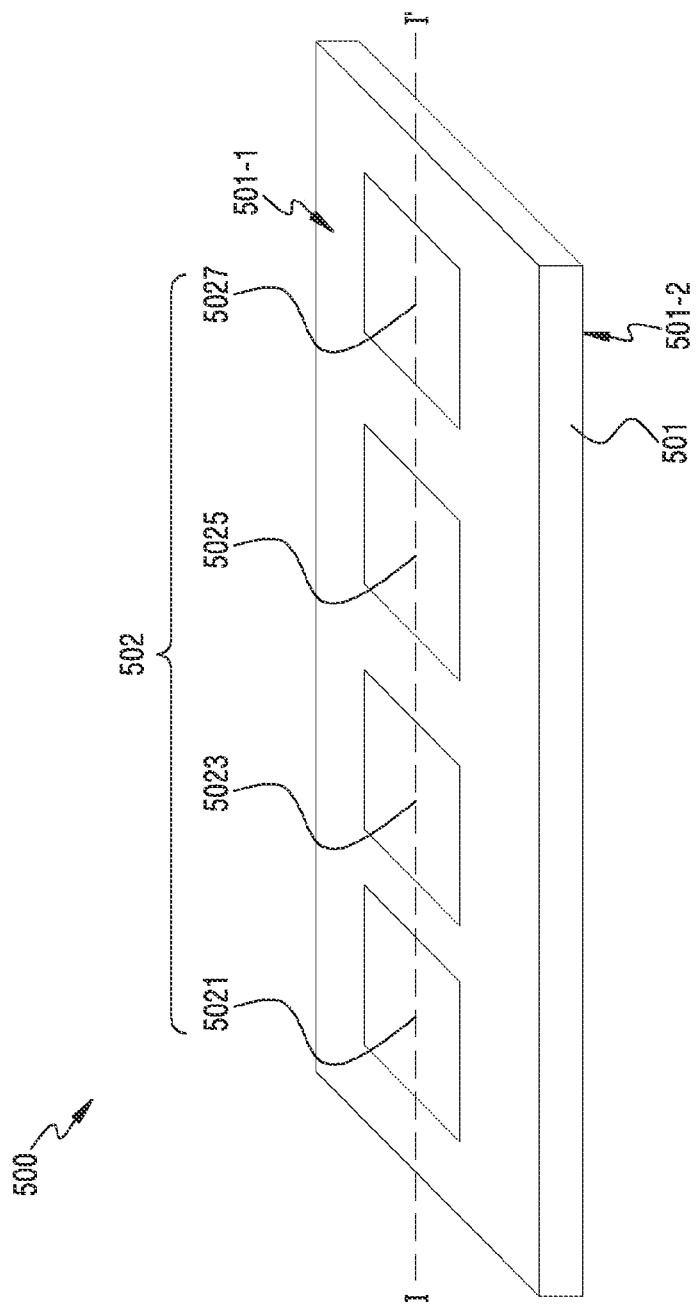
FIG. 6A illustrates a side view of an antenna module in according to an embodiment.
Figure 6B:
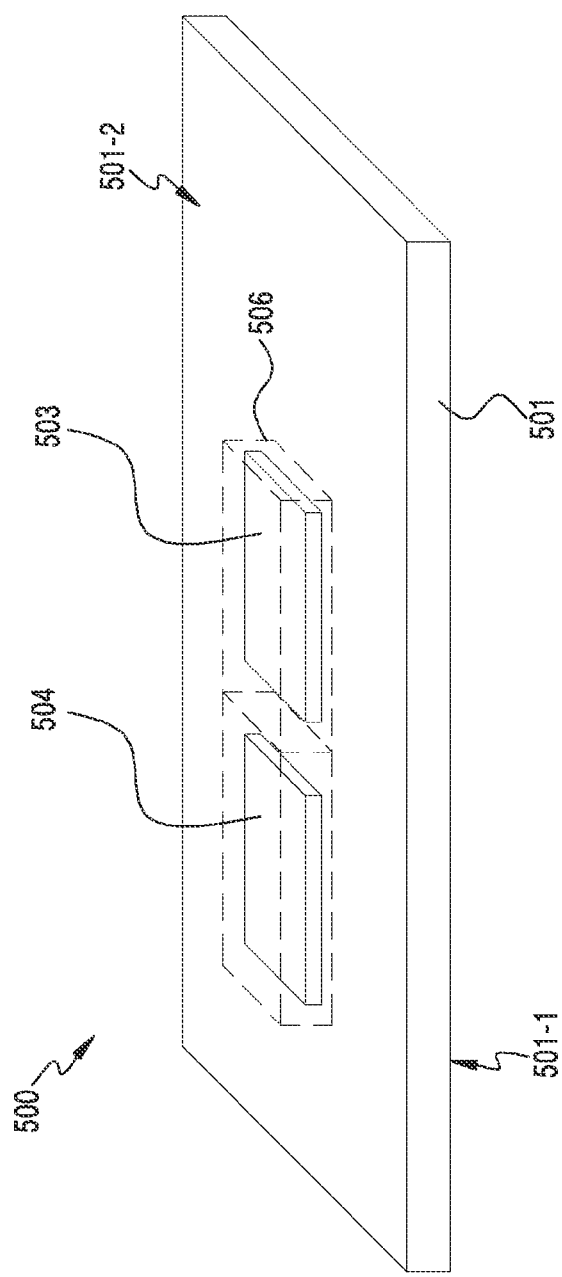
FIG. 6B illustrates the antenna module of FIG. 6A from the other side, according to an embodiment.
Figure 6C:
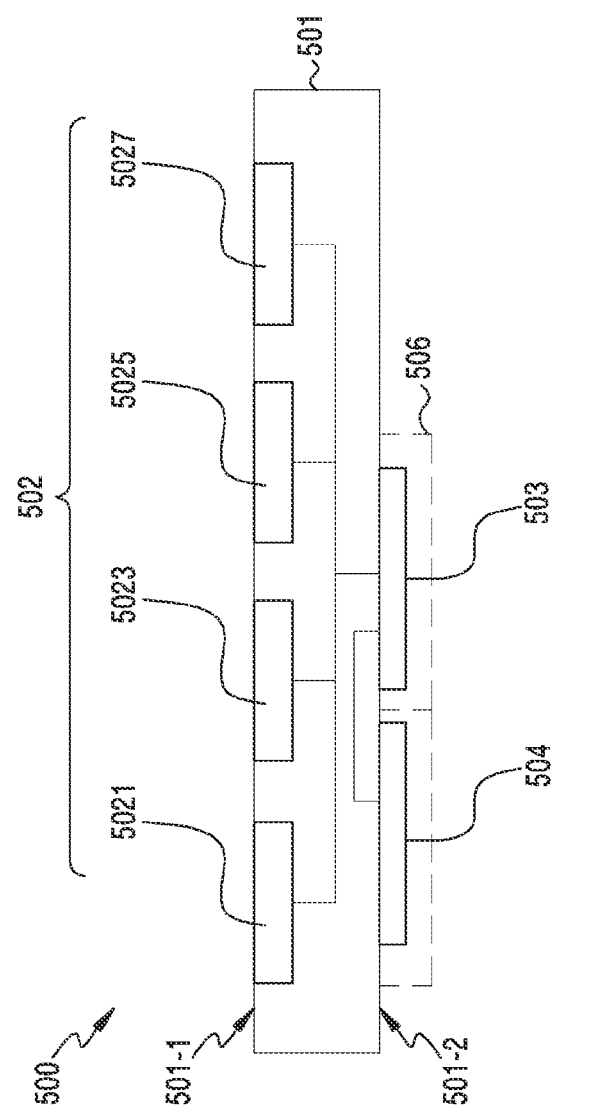
FIG. 6C illustrates a cross-sectional view of the antenna module of FIG. 6A, taken along I-I', according to an embodiment.

FIG. 6A illustrates a side view of an antenna module according to an embodiment, FIG. 6B illustrates the antenna module of FIG. 6A, viewed from another side, according to an embodiment, and FIG. 6C illustrates a cross-sectional view of the antenna module of FIG. 6A, taken along I-I', according to an embodiment.

Referring to FIGS. 6A, 6B, and 6C, an antenna module 500 includes a PCB 501, an antenna array 502, an RFIC 503, a PMIC 504, and a module interface. The antenna module 500 may further include a shield member 506.

The PCB 501 may include a plurality of conductive layers, and a plurality of nonconductive layers which are deposited by alternating with the conductive layers. The PCB 501 may provide electrical connections between the PCB 501 and/or various electronic components disposed outside, using wires and conductive vias of the conductive layers.

The antenna array 502 includes a plurality of antenna elements 5021 through 5027 for forming a directional beam. The antenna elements 5021 through 5027 may be formed on a first surface 501-1 (or a radiation surface) of the PCB 501 as illustrated in FIG. 6A.

Alternatively, the antenna array 502 may be formed inside the PCB 501. For example, the antenna array 502 may be formed in a conductive layer inside the PCB 501.

The antenna array 502 may include a plurality of antenna arrays (e.g., a patch antenna array) of the same or different shapes or types and/or a dipole antenna array. The antenna elements of the antenna array 502 may be connected to a channel (or a port) independent from the RFIC 503 to transmit and/or receive RF signals of different frequency bands.

The RFIC 503 may be disposed in another area (e.g., a second surface 501-2 which is opposite to the first surface) of the PCB 501, spaced from the antenna array 502. The RFIC 503 may be configured to process a signal of a designated frequency band transmitted or received via the antenna array 502. In transmission, the RFIC 503 may convert a baseband signal obtained from a CP to an RF signal of the designated band. In reception, the RFIC 5035 may convert an RF signal received via the antenna array 502 to a baseband signal and provide the baseband signal to the CP.

In transmission, the RFIC 503 may up-convert an IF signal (e.g., about 9 GHz through about 11 GHz) obtained from an IFIC to an RF signal of a selected band. In reception, the RFIC 503 may down-convert an RF signal received via the antenna array 502 to an IF signal and provide the IF signal to the IFIC.

The PMIC 504 may be disposed in another area of the PCB 501 (e.g., the second surface 501-2 of the PCB 501), spaced from the antenna array 502. The PMIC 504 may receive voltage from a main PCB, and provide necessary power to various parts (e.g., the RFIC 503) on the antenna module.

The shield member 506 may be disposed on part of the PCB 501 (e.g., the second surface 501-2 of the PCB 501) to electrically shield at least one of the RFIC 503 or the PMIC 504. The shield member 506 may include a shield can. The shield member 506 may be a structure which attaches a shield adhesive member (or a shield tape) to a shield frame, or may be a shield adhesive member attachable to an area of the PCB 501.

The antenna module 500 may be electrically connected with another PCB through the module interface. The module interface may include at least one of a coaxial cable, a board to board (B to B) connector, an interposer, or an FPCB. The RFIC 503 and/or the PMIC 504 of antenna module 500 may be electrically connected with the another PCB through the above-described module interface.

Figure 7:
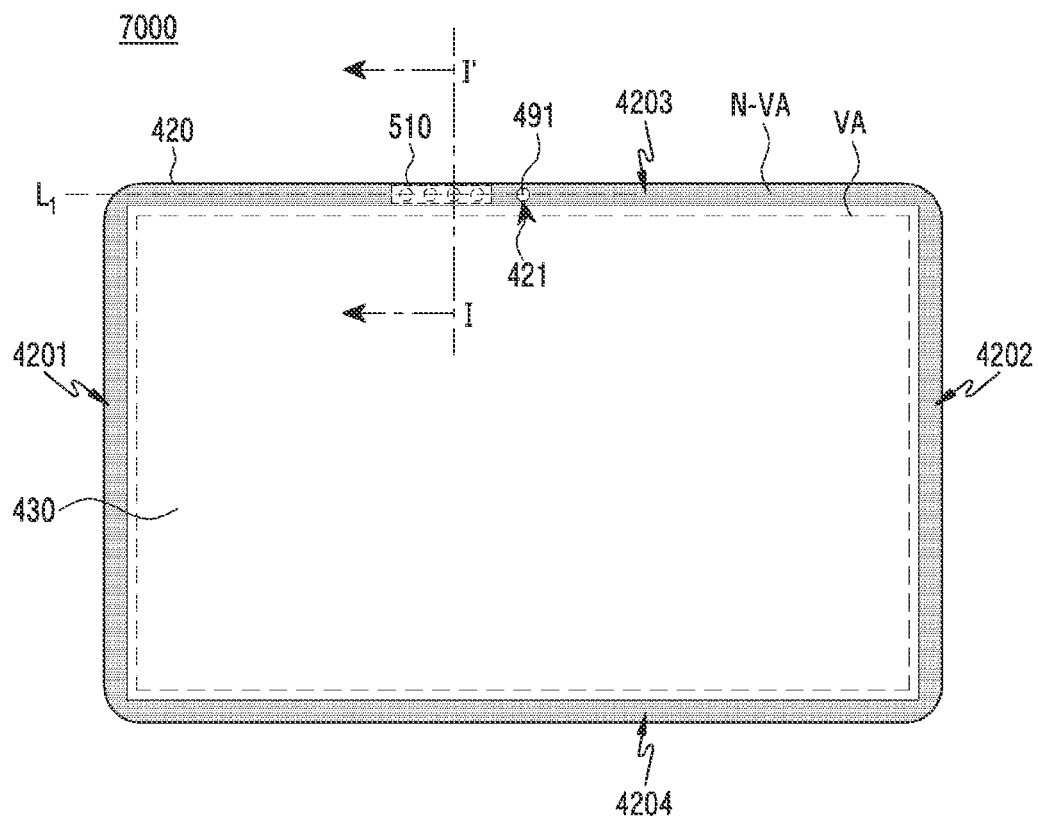
FIG. 7 illustrates a front surface of an electronic device according to an embodiment.
Figure 7:
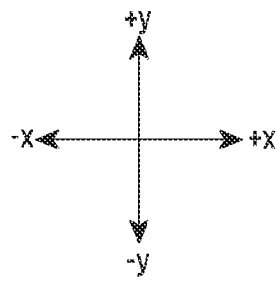

FIG. 7 illustrates a front surface of an electronic device according to an embodiment.

Referring to FIG. 7, an electronic device 7000 includes a cover window 420, a display 430, a first camera module 491, and a first antenna module 510.

The cover window 420 may include a VA (or an active area) and/or a N-VA (or an inactive area), and may form a front surface of the electronic device 7000.

The VA of the cover window 420 may be formed with a substantially transparent material, and at least part of the display 430 disposed on a rear surface of the cover window 420 may be viewed in the front surface of the electronic device 7000 through the VA.

The N-VA of the cover window 420 may be disposed to surround edges of the VA. For example, the N-VA may be formed by attaching a printing layer (or a BM) along the edges of the cover window 420. The N-VA may be formed by opaquely coating one area of the cover window 402, or by coloring one area of the cover window 402 with an opaque color. The N-VA of the cover window 420 may include a curved area from the front surface of the electronic device 7000 toward the side surface. For example, the curved area of the N-VA may be tilted at a specific angle toward the side surface based on the front surface of the electronic device 7000.

The N-VA of the cover window 420 includes a first area 4201 disposed at a left edge (e.g., an edge of the −x direction) of the VA and/or a second area 4202 disposed in parallel with the first area 4201 at a right edge (e.g., an edge of the +x direction) of the VA. The N-VA of the cover window 420 includes a third area 4203 connected with one end of the first area 4201 and one end of the second area 4202 and disposed at an upper edge (e.g., an edge of the +y direction) of the VA and/or a fourth area 4204 disposed in parallel with the third area 4203 at a lower edge (e.g., an edge of the −y direction) of the VA. The third area 4203 and/or the fourth area 4204 of the N-VA may be formed relatively longer than the first area 4201 and/or the second area 4202. A length ratio between the third area 4203 and/or the fourth area 4204 and the first area 4201 and/or the second area 4202 may be, but not limited to, 16:9 or 21:9. The first area 4201 and/or the second area 4202 of the N-VA may be formed relatively longer than the third area 4203 and/or the fourth area 4204.

A plurality of conductive portions and/or a plurality of nonconductive portions which segment the conductive portions of a frame operating as an antenna radiator may be disposed on a rear surface of the first area 4201 and/or the second area 4202 of the N-VA.

A first camera module 491 may be disposed in at least one area of the rear surface of the third area 4203 of the N-VA. At least one area of the third area 4203 may include a view portion 421, and at least part of the first camera module 491 may be viewed through the view portion 421 in the front surface of the electronic device 7000. For example, the view portion 421 may be formed at a center of the third area 4203. The view portion 421 may be formed to lean in a left direction (e.g., the −x direction) based on the center of the third area 4203, or to lean in a right direction (e.g., the +x direction) based on the center of the third area 4203. Incident light from the front surface of the electronic device 7000 may be transmitted to the first camera module 491 through the view portion 421, and the first camera module 491 may obtain a field of view (FOV) toward the front surface of the electronic device 7000.

The rear surface of the fourth area 4204 of the N-VA may include some area of an FPCB for electrically connecting the display 430 and a PCB disposed inside the electronic device 7000.

As some area of the frame operating as the antenna radiator is disposed on the rear surface of the first area 4201 and/or the second area 4202 of the N-VA and some area of the FPCB is disposed on the rear surface of the fourth area 4204 of the N-VA, the first antenna module 510 may be disposed in one area of the rear surface of the third area 4203 of the N-VA. The first antenna module 510 may be disposed on the rear surface of the third area 4203 of the N-VA, spaced from the first camera module 491 by a designated distance. For example, the first antenna module 510 and the first camera module 491 may be aligned in the horizontal direction on a first virtual axis $L_1$. The first virtual axis $L_1$ may indicate a virtual line passing one area of the first antenna module 510 and/or one area of the first camera module 491, and may be used hereafter with the same meaning. For example, the first virtual axis $L_1$ may be in parallel to the +x axis, but the first virtual axis $L_1$ may be a line making a specific angle with the +x axis.

The first antenna module 510 may be disposed on the rear surface of the N-VA, to form a beam pattern toward the front surface of the electronic device 7000 through the N-VA. The first antenna module 510 may transmit an RF signal of a designated frequency band to an external electronic device (or receive an RF signal of the designated frequency band from the external electronic device. The designated frequency band may be about 28 GHz and/or about 39 GHz frequency band.

The description of the electronic device 400 of FIG. 4 may also be applied to the electronic device 7000.

Figure 8B:
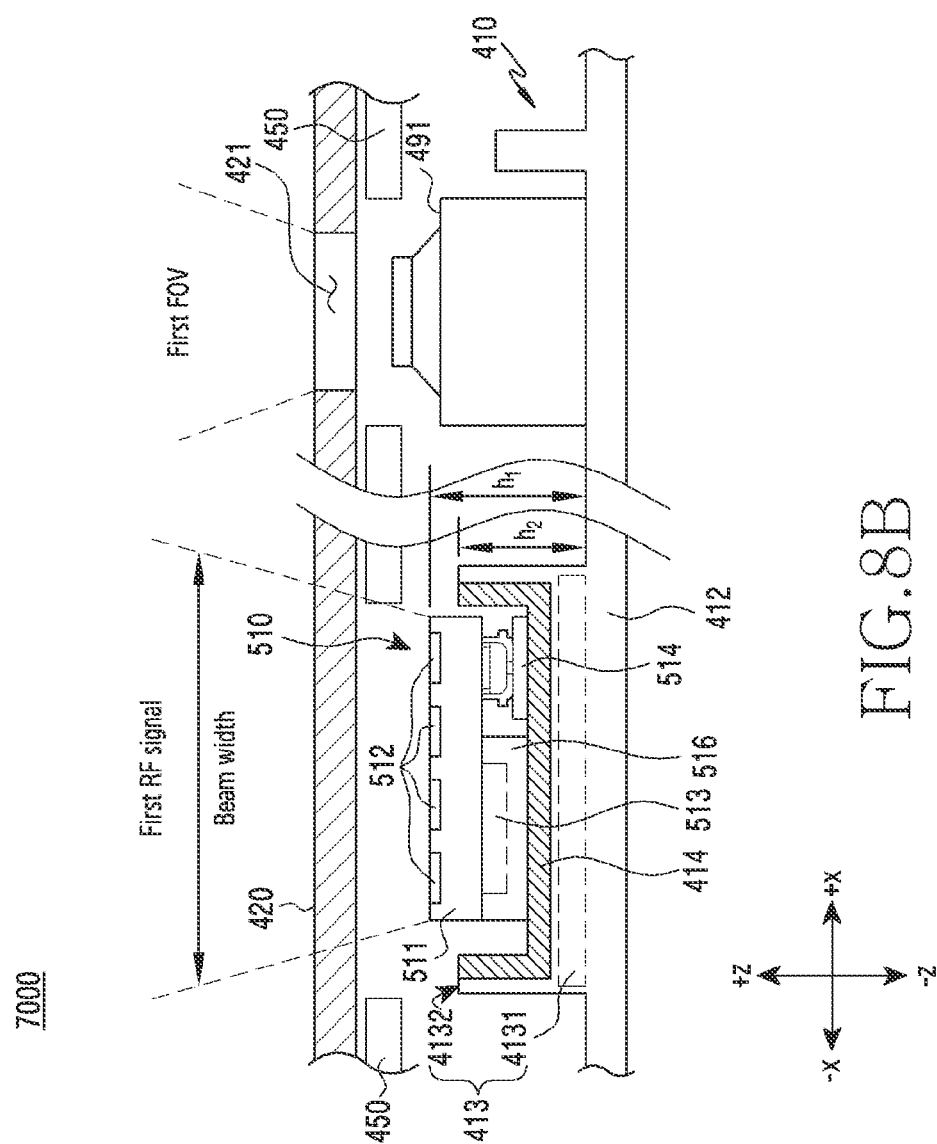
FIG. 8B illustrates a cross-sectional view of the electronic device of FIG. 8A, taken along A-A', according to an embodiment.
Figure 8C:
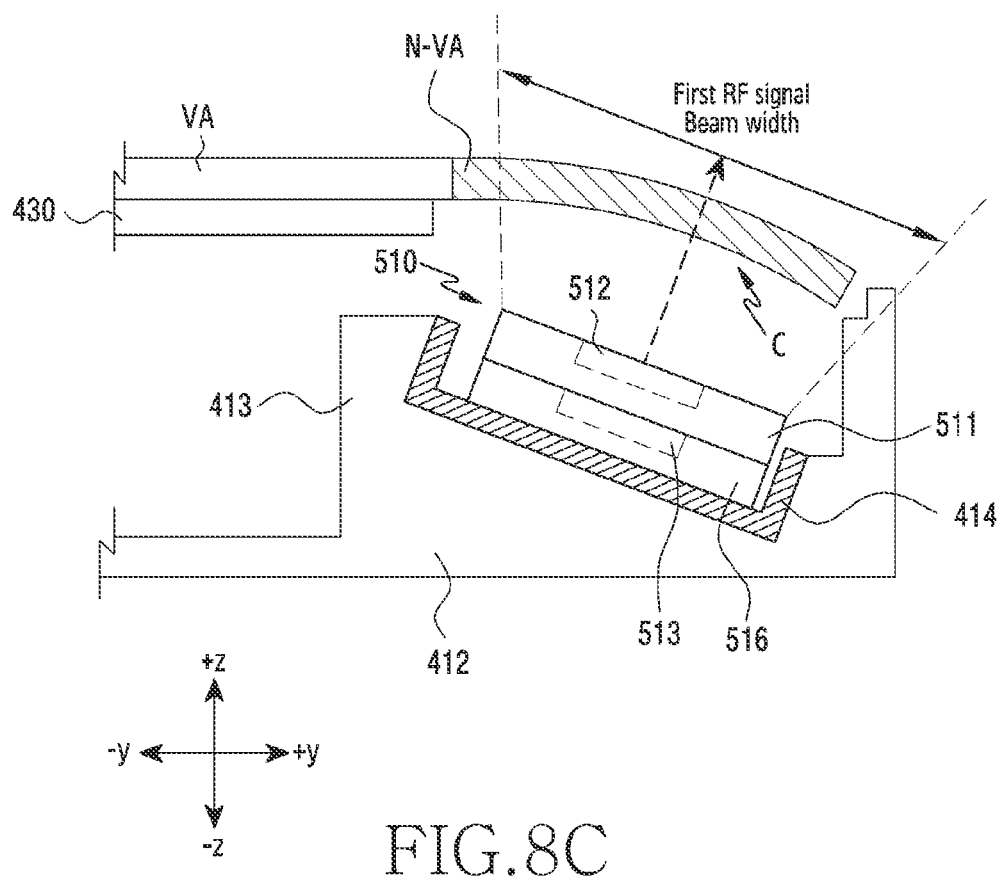
FIG. 8C illustrates a cross-sectional view of the electronic device of FIG. 7, taken along I-I', according to an embodiment.

FIG. 8A illustrates an inside of the electronic device of FIG. 7, viewed from a front surface, according to an embodiment, FIG. 8B illustrates a cross-sectional view of the electronic device of FIG. 8A, taken along A-A', according to an embodiment, and FIG. 8C illustrates a cross-sectional view of the electronic device of FIG. 7, taken along I-I', according to an embodiment.

Referring to FIG. 8A, FIG. 8B, and FIG. 8C, the electronic device 7000 includes a frame 410, a cover window 420, a display 430, a PCB, a support member 450, a first camera module 491, and a first antenna module 510.

The frame 410 includes a first structure 411 and a second structure 412. The first structure 411 of the frame 410 may form a side surface and/or a rear surface of the electronic device 7000. The first structure 411 may be disposed to surround edges of the second structure 412, or the first structure 411 and the second structure 412 may be integrally formed.

The second structure 412 of the frame 410 may include at least one electronic component, and the second structure 412 may support the at least one electronic component. The PCB 440, the first camera module 491, and/or the first antenna module 510 may be disposed on one surface toward the +z direction of the second structure 412. For example, the PCB 440 may be disposed in at least part of an area (an area A) corresponding to a VA of the cover window 420 of the second structure 412 and/or an area (an area B) corresponding to an N-VA of the cover window 420. The first camera module 491 and/or the first antenna module 510 may be disposed in the area (the area B) corresponding to the N-VA of the cover window 420. The first antenna module 510 may be spaced from the first camera module 491 by a designated distance. The first camera module 491 and/or the first antenna module 510 may be aligned in the horizontal direction (e.g., the +x direction) on a first virtual axis $L_1$.

The first camera module 491 may be disposed in an area corresponding to a view portion 421 of the N-VA of the cover window. For example, when viewed from above (e.g., the +z direction) of the cover window 420, the view portion 421 of the cover window 420 and at least one area of the first camera module 491 may be overlapped. The first camera module 491 may obtain a first FOV toward the front direction (e.g., the +z direction) of the electronic device 7000 through the view portion 421.

The first antenna module 510 includes a first PCB 511, a first antenna array 512, and/or a first RFIC 513. The first antenna array 512 may be disposed in one surface (e.g., one surface of the +z direction) toward the cover window 420 of the first PCB 511, and the first RFIC 513 may be disposed in one surface (e.g., one surface of the −z direction) toward the second structure 412 of the first PCB 511. The first antenna array 512 may be disposed in one surface toward the cover window 420 of the first PCB 511, to operate as a radiator which forms a beam pattern toward the cover window 420 (e.g., +z direction).

The first RFIC 513 may be packaged in one surface toward the second structure 412 of the first PCB 511 by a first shield member 516, and the first shield member 516 may electromagnetically shield the first RFIC 513. The first shield member 516 may be formed with an epoxy material.

The first antenna module 510 may be electrically connected with the PCB 440 through the first FPCB 514. The first RFIC 513 of the first antenna module 510 may be electrically connected with wireless communication circuitry disposed on the PCB 440 through the first FPCB 514. The wireless communication circuitry may control an angle of the beam pattern generated at the first antenna array 512, by controlling a phase and/or a frequency of the RF signal generated at the first antenna array 512 through the first RFIC 513. The first antenna module 510 may generate a first RF signal toward the cover window 420 through the first antenna array 512 and/or the first RFIC 513. The first antenna module 510 may generate the first RF signal toward substantially the same direction as the first FOV of the first camera module 491.

Referring to FIG. 8C, the first antenna module 510 may be tilted a specific angle toward the side surface based on the front surface of the electronic device 7000. For example, the first antenna module 510 may be tilted the specific angle toward the +y axis based on the +z axis. A radiation surface of the first antenna module 510 may be disposed at a position corresponding to a curved area C (or an edge area) of the N-VA of the cover window 420. The curved area C of the N-VA may indicate a curved area toward the side surface from the front surface of the electronic device 7000. The first antenna module 510 may form a beam pattern toward one direction between the +z axis and the +y axis in the above-described structure.

The second structure 412 of the frame 410 may include a support structure 413 protruding toward the cover window 420 (e.g., in the +z direction) in at least one area of the second structure 412, and receiving the first antenna module 510.

The support structure 413 may be formed in at least one area of the area (the area B) corresponding to the N-VA of the cover window 420 of the second structure 412, and may include a body portion 4131 and/or a protruding portion 4132. The first antenna module 510 may be disposed in at least one area of one surface (e.g., one surface toward the +z direction) toward the cover window 420 of the body portion 4131. For another example, the protruding portion 4132 may be disposed in at least one edge of the body portion 4131, and may protrude toward the cover window 420 in the body portion 4131. The body portion 4131 and/or the protruding portion 4132 disposed in at least one edge of the body portion 4131 may form a recess in one surface toward the cover window 420 of the support structure 413. The first antenna module 510 may be disposed in the recess, and supported by the support member 413.

The support member 413 may include an insulating member 414 formed with a nonconductive material (e.g., plastic) and interposed between the first antenna module 510 and the support structure 413. The insulating member 414 may be disposed inside the recess of the support structure 413 formed by the body portion 4131 and/or the protruding portion 4132. The insulating member 414 may be disposed in at least one area of one surface toward the cover window 420 of the body portion 4131 and/or at least one area of an inner side surface of the protruding portion 4132. The insulating member 414 may prevent current leaked from the first antenna module 510 (hereafter, referred to as leakage current) from flowing into the second structure 412 formed with a conductive material (e.g., a metal), thus preventing a user from being electrocuted by the leakage current.

The support member 413 may be formed lower in height than the first antenna module 510. The first antenna module 510 may be formed with first height $h_1$ based on the body portion 4131 of the support structure 413. The protruding portion 4132 may be formed with second height $h_2$ lower than the first height $h_1$ based on the body portion 4131, and a gap may be formed between the first antenna module 510 and the protruding portion 4132. A difference of the height $h_1$ of the first antenna module 510 and the height $h_2$ of the protruding portion 4132 may be about 0.4 mm, and the gap may be formed between the first antenna module 510 and the protruding portion 4132 due to the height difference of the first antenna module 510 and the protruding portion 4132. The height difference of the first antenna module 510 and the protruding portion 4132 is not limited to the example above.

If the protruding portion 4132 is formed at the same height as the first antenna module 510 or to be higher than the first antenna module 510, the protruding portion 4132 may interfere with the beam pattern formed at the first antenna module 510. The protruding portion 4132 may interfere the beam pattern formed toward the +x direction or the -x direction of the first antenna module 510. By forming the protruding portion 4132 of the support structure 413 lower than the first antenna module 510, the electronic device 7000 may reduce the interference of the support structure 413 in the beam pattern radiated from the first antenna module 510.

Figure 9A:
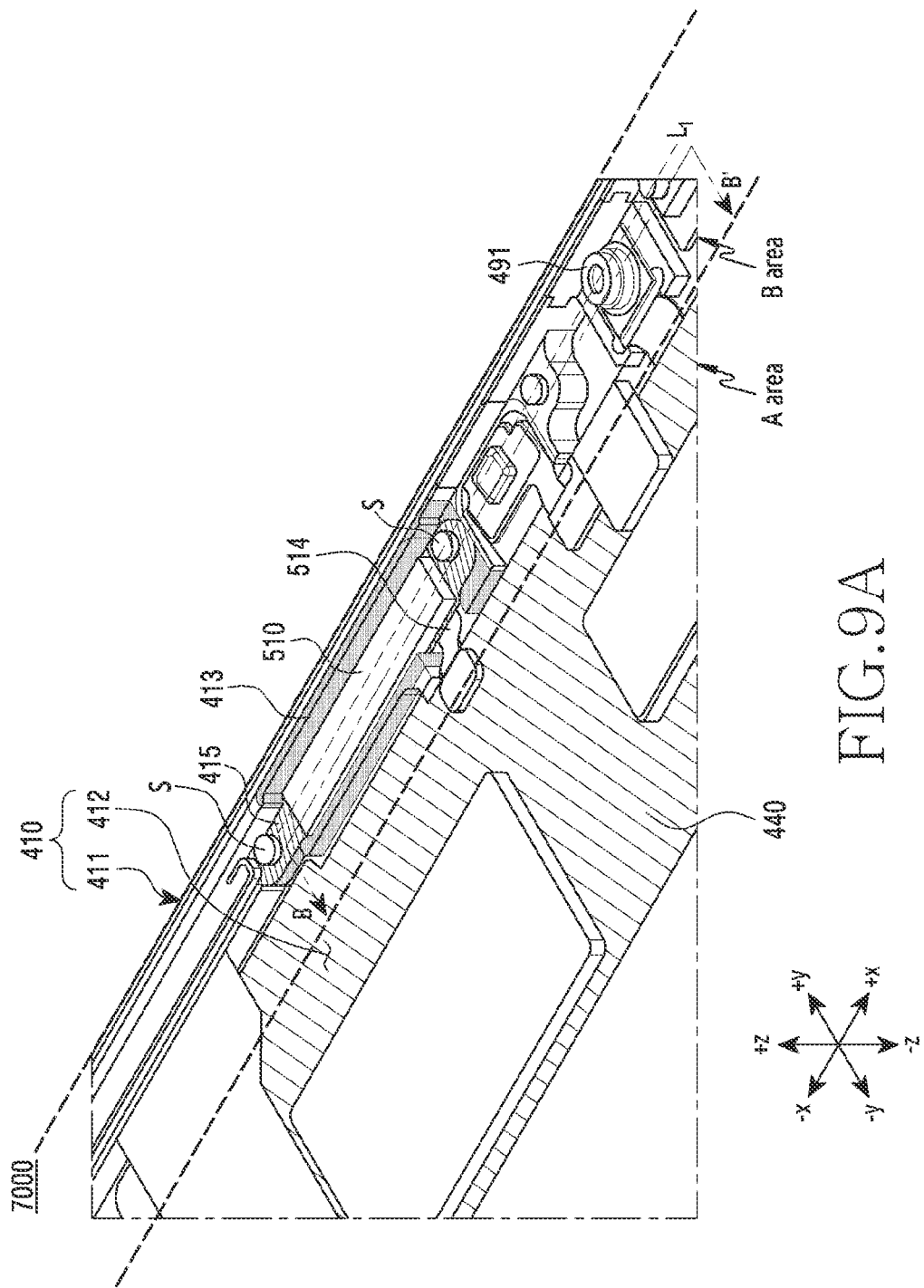
FIG. 9A illustrates a partial area with a display panel removed in an electronic device of FIG. 7 according to an embodiment.
Figure 9B:
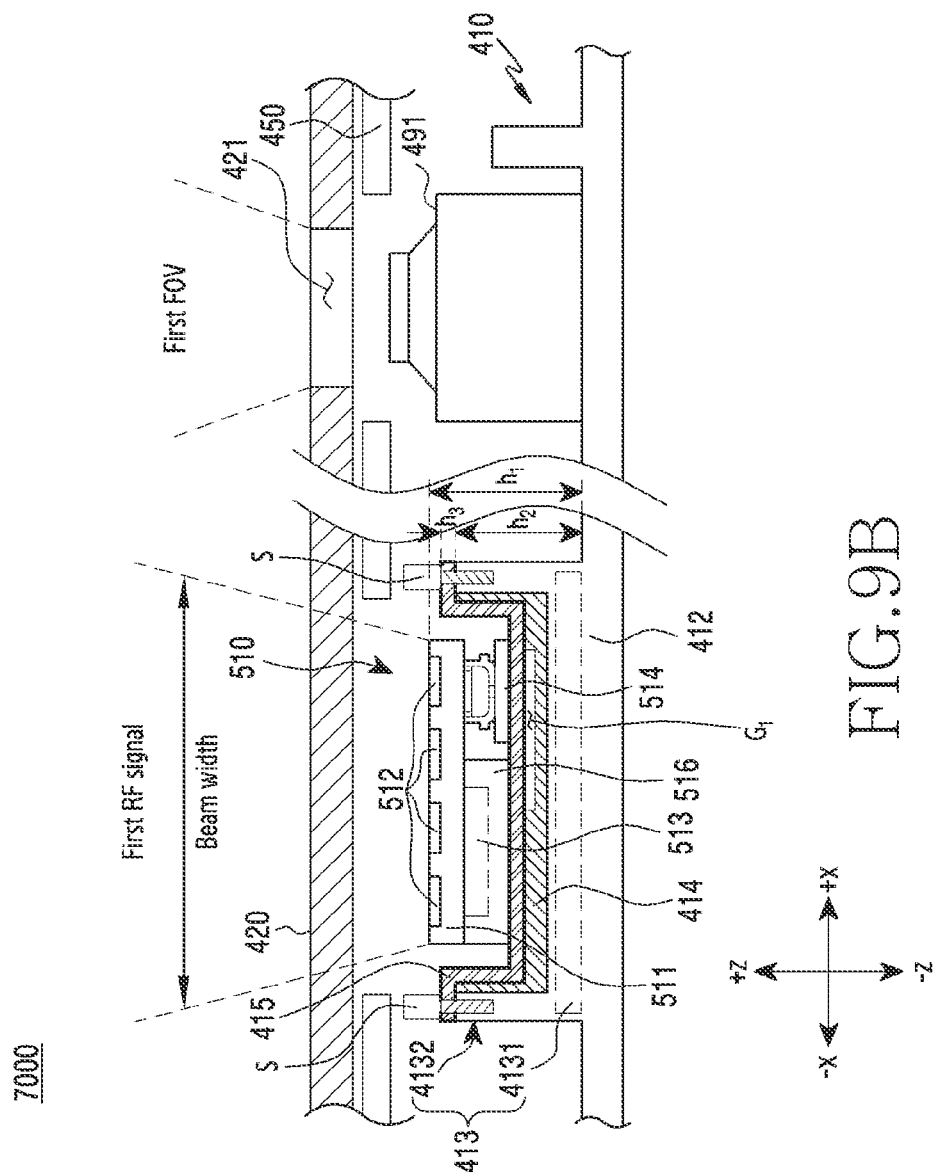
FIG. 9B illustrates a cross-sectional view of the electronic device of FIG. 9A, taken along B-B', according to an embodiment.

FIG. 9A illustrates a partial area, without a display panel, in the electronic device of FIG. 7 according to an embodiment, and FIG. 9B illustrates a cross-sectional view of the electronic device of FIG. 9A, taken along B-B', according to an embodiment. Specifically, FIG. 9A illustrates an inside of the electronic device, 7000 without a cover window and a display on the front surface (e.g., in the +z direction).

Referring to FIGS. 9A and 9B, the electronic device 7000 includes a frame 410, a first support frame 415, a cover window 420, a PCB 440, a support member 450, a first camera module 491, and/or a first antenna module 510.

The frame 410 includes a first structure 411 and/or a second structure 412. The first structure 411 of the frame 410 may form a side surface and/or a rear surface of the electronic device 7000. The first structure 411 may be disposed to surround edges of the second structure 412. The first structure 411 and the second structure 412 may be integrally formed.

The second structure 412 of the frame 410 may include at least one electronic component, and the second structure 412 may support the at least one electronic component. The PCB 440, the first camera module 491, and/or the first antenna module 510 may be disposed in one surface toward the +z direction of the second structure 412. For example, the PCB 440 may be disposed in an area (an area A) corresponding to a VA of the cover window 420 of the second structure 412 and/or at least part of an area (an area B) corresponding to an N-VA of the cover window 420. The first camera module 491 and/or the first antenna module 510 may be disposed in the area (the area B) corresponding to the N-VA of the cover window 420. The first antenna module 510 may be spaced from the first camera module 491 by a designated distance. The first camera module 491 and/or the first antenna module 510 may be aligned in the horizontal direction (e.g., the +x direction) on a first virtual axis $L_1$.

The first camera module 491 may be disposed in an area corresponding to a view portion 421 of the N-VA of the cover window. For example, when viewed from above (e.g., in the +z direction) of the cover window 420, the view portion 421 of the cover window 420 and at least one area of the first camera module 491 may be overlapped. The first camera module 491 may obtain a first FOV toward a front direction (e.g., the +z direction) of the electronic device 7000 through the view portion 421.

The first antenna module 510 may include a first PCB 511, a first antenna array 512, and/or a first RFIC 513. The first antenna array 512 may be disposed in one surface (e.g., one surface of the +z direction) toward the cover window 420 of the first PCB 511, and the first RFIC 513 may be disposed in one surface (e.g., one surface of the −z direction) toward the second structure 412 of the first PCB 511. The first RFIC 513 may be packaged in one surface toward the second structure 412 of the first PCB 511 by a first shield member 516, and the first shield member 516 may electromagnetically shield the first RFIC 513. The first shield member 516 may be formed with an epoxy material.

The first antenna array 512 may be disposed in one surface toward the cover window 420 of the first PCB 511, to operate as a radiator which forms a beam pattern toward the cover window 420 (e.g., the +z direction). The first antenna module 510 may be electrically connected with the PCB 440 through the first FPCB 514. The first RFIC 513 of the first antenna module 510 may be electrically connected with wireless communication circuitry disposed on the PCB 440 through the first FPCB 514. The wireless communication circuitry may control an angle of the beam pattern generated at the first antenna array 512, by controlling a phase and/or a frequency of an RF signal generated at the first antenna array 512 through the first RFIC 513. The first antenna module 510 may generate a first RF signal toward the cover window 420 through the first antenna array 512 and/or the first RFIC 513. The first antenna module 510 may generate the first RF signal toward substantially the same direction as the first FOV of the first camera module 491.

The second structure 412 of the frame 410 includes a support structure 413 protruding toward the cover window 420 (e.g., the +z direction) in at least one area of the second structure 412. The support structure 413 may be formed in at least one area of the area (the area B) corresponding to the N-VA of the cover window 420 of the second structure 412, and may include a body portion 4131 and/or a protruding portion 4132. The first antenna module 510 may be disposed in at least one area of one surface (e.g., one surface toward the +z direction) toward the cover window 420 of the body portion 4131. The protruding portion 4132 may be disposed in at least one edge of the body portion 4131, and may protrude toward the cover window 420 in the body portion 4131. The body portion 4131 and/or the protruding portion 4132 disposed in at least one edge of the body portion 4131 may form a recess in one surface toward the cover window 420 of the support structure 413.

The support member 413 may include an insulating member 414 formed with a nonconductive material (e.g., plastic) and interposed between the first antenna module 510 and the support structure 413. The insulating member 414 may be disposed inside the recess of the support structure 413 formed by the body portion 4131 and/or the protruding portion 4132. The insulating member 414 may be disposed in at least one area of one surface toward the cover window 420 of the body portion 4131 and/or at least one area of an inner side surface of the protruding portion 4132.

The first support frame 415 may be disposed in the recess of the support member 415, to support the first antenna module 510. The first support frame 415 may be disposed within the recess and/or in at least one area of one surface toward the cover window 420 of the protruding portion 4132. The first support frame 415 may be disposed on (e.g., in the +z direction) of the insulating member 414 of the support structure 413. The first support frame 415 may be secured to the protruding portion 4132 using a screw S. A screw hole may be formed in an area corresponding to the protruding portion 4132 of the first support frame 415. The screw S is fastened between the first support frame 415 and the protruding portion 4132 through the screw hole, and thus, the first support frame 415 may be secured to at least one area (e.g., the protruding portion 4132) of the support structure 413.

The first antenna module 510 may be attached to at least one area of the first support frame 415. An adhesive member may be disposed between the first antenna module 510 and one surface toward the cover window 420 of the first support frame 415, and the first antenna module 510 may be attached to at least one area of the first support frame 415 using the adhesive member. The adhesive member may be an adhesive tape including a thermally conductive sheet.

The first support frame 415 may be formed of a conductive material (e.g., a metal), to support the first antenna module 510 and also radiate heat generated from the first antenna module 510. Excessive heat may generate if the first antenna module 510 generates the RF signal, and this heat may cause performance degradation of the first antenna module 510. Accordingly, the first support frame 415 may include a working fluid therein, and may be formed in a vapor chamber structure for radiating the heat from the first antenna module 510 using phase change of the working fluid.

The first support frame 415 may transfer the heat from the first antenna module 510 to the frame 410, by contacting at least part (e.g., the first RFIC 513) of the first antenna module 510. The heat generated from the first antenna module 510 may be transferred to the second structure 412 of the frame 410 through the first support frame 415 and/or the screw S, which secures the first support frame 415 and the support frame 413, and the first support frame 415 may radiate the heat generating from the first antenna module 510 through this heat transfer.

A groove $G_1$ may be formed in at least one area of the insulating member 414 in which the first support frame 415 is disposed, to form an air gap between the first support frame 415 and the insulating member 414. The air gap between the insulating member 414 and the first support frame 415 may provide a space for radiating the heat generated from the first antenna module 510. The air gap between the insulating member 414 and the first support frame 415 may prevent hot spot in one area of the second structure 412 of the frame 410. For example, heat diffusion through the first support frame 415 may be faster than heat diffusion through the air gap between the insulating member 414 and the first support frame 415, and the air gap may prevent the hot spot in one area of the second structure 412 using the heat diffusion difference.

The support member 413 may be formed to be lower in height than the first antenna module 510. In one example, the first antenna module 510 may be formed with first height $h_1$ based on the body portion 4131 of the support structure 413. The protruding portion 4132 may be formed with second height $h_2$ based on the body portion 4131, and the first support frame 214 disposed on the protruding portion 4132 may have third height $h_3$. The first height $h_1$ may be greater than a sum of the second height $h_2$ and the third height $h_3$, and accordingly, a gap may be formed between the first antenna module 510 and the first support frame 415 disposed on the protruding portion 4132. The first antenna module 510 and the first support frame 415 may have the gap of about 0.4 mm.

If the first antenna module 510 is formed lower than the protruding portion 4132 and/or the first support frame 415, the protruding portion 4132 and/or the first support frame 415 may interfere a beam pattern generated at the first antenna module 510. For example, the protruding portion 4132 and/or the first support frame 415 may prevent the beam pattern formed toward the +x direction or the −x direction. An area of the screw S (e.g., a head area of the screw S) may be formed to be higher than one surface of the +z direction of the first antenna module 510. For example, a gap of about 1.4 mm may be formed between the head area of the screw S and the one surface toward the +z direction of the first antenna module 510.

The screw S may be positioned out of a beam width of a first RF signal generated at the first antenna module 510. Even if the some area of the screw S (e.g., the head area of the screw S) is formed higher than the first antenna module 510, the beam pattern generation of the first antenna module 510 may not be interfered based on the above-described structure. By forming the gap between the first antenna module 510 and the first support frame 415, the electronic device 7000 may reduce the interference of the protruding portion 4132 of the support structure 413 and/or the first support frame 415 in the beam pattern radiated from the first antenna module 510.

Figure 10:
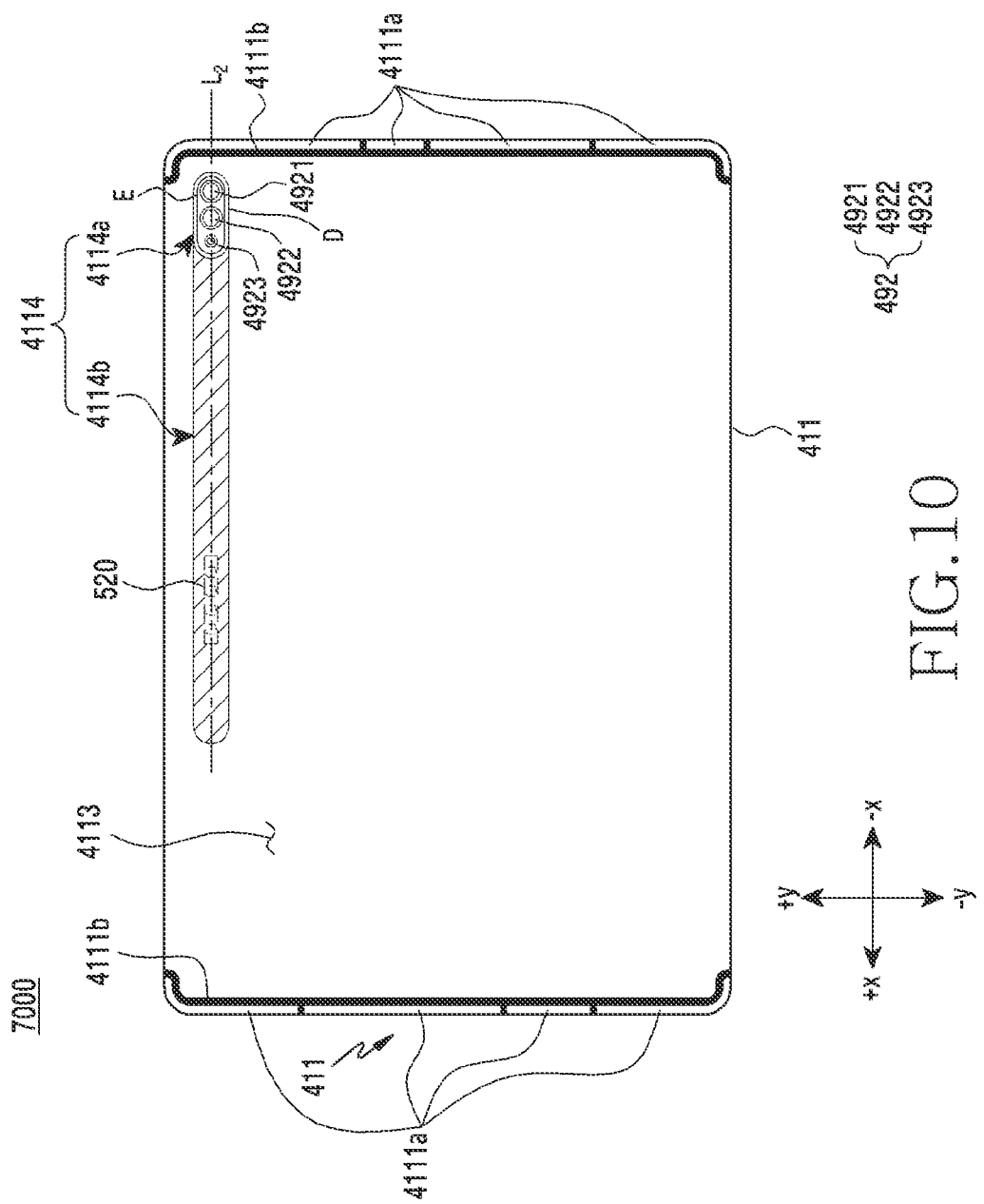
FIG. 10 illustrates a rear surface view of an electronic device according to an embodiment.

FIG. 10 illustrates a rear surface of an electronic device according to an embodiment.

Referring to FIG. 10, the electronic device 7000 includes a frame 410, a second camera module 492, and a second antenna module 520. At least one of the components of the electronic device 7000 may be identical to similar to at least one of the components of the above-described electronic devices 7000, and redundant explanations shall be omitted.

The frame 410 includes a first structure 411 which forms a side surface and/or a rear surface of the electronic device 7000. At least one surface of the first surface 411 which forms the side surface of the electronic device 7000 includes a plurality of conductive portions 4111a and a plurality of nonconductive portions 4111b for insulating the conductive portions 4111a. The conductive portions 4111a and the nonconductive portions 4111b may be disposed in a left area (e.g., the +x direction) and/or a right area (e.g., the −x direction) of the electronic device 7000. The conductive portions 4111a of the first structure 411 may be electrically connected with wireless communication circuitry disposed on a PCB and/or a ground of the PCB. The conductive portions 4111a may operate as an antenna radiator (e.g., an inverted F antenna (IFA)) for transmitting and/or receiving the RF signal of the designated frequency band using the electrical connection.

A surface of the first structure 411 that forms the rear surface of the electronic device 7000 may include a conductive area 4113 formed with a conductive material (e.g., a metal) and/or a nonconductive area 4114 formed at least in part with a nonconductive material (e.g., a polymer).

The nonconductive area 4114 may include a window area 4114a and/or a nonconductive member 4114b formed with a nonconductive material (e.g., a polymer). The window area 4114a may be formed at a position corresponding to at least part of the second camera module 492, and formed at least in part with a transparent material. At least part of the second camera module 492 is visible in the rear surface of the electronic device 7000. The window area 4114a may include a decoration member D disposed to surround at least one area of edges of the window area 4114a and/or an enclosure E disposed between the window area 4114a and the decoration member D. The decoration member D may be formed with a glass material or a plastic material.

A slot extending along the +x direction based on the window area 4114a may be formed in one surface of the first structure 411, which forms the rear surface of the electronic device 7000. The nonconductive member 4114b may be disposed within the slot, to form at least part of the rear surface of the electronic device 7000.

The second camera module 492 may be disposed in an area corresponding to the window area 4114a of the nonconductive area 4114 of the electronic device 7000. When viewed from the rear surface of the electronic device 7000, at least one area of the second camera module 492 may be disposed to overlap the window area 4114a. The second camera module 492 may include a 2-1 camera 4921 (a 2-2 camera 4922, and/or a flash 4923. At least part of the 2-1 camera 4921, the 2-2 camera 4922, and/or the flash 4923 (e.g., some area of lens portions of the 2-1 camera 4921, the 2-2 camera 4922, and/or the flash 4923) may be visually exposed in the rear surface of the electronic device 7000 through the window area 4114a.

The second antenna module 520 may be disposed in an area corresponding at least in part to one portion of the nonconductive member 4114b of the nonconductive area 4114 of the electronic device 7000. For example, when viewed from the rear surface of the electronic device 7000, the second antenna module 520 may be disposed to overlap one portion of the nonconductive member 4114b. The second antenna module 520 may be spaced from the second camera module 492. For example, the second antenna module 520 and the second camera module 492 may be aligned in the horizontal direction (e.g., the +x direction) on a second virtual axis $L_2$. The second virtual axis $L_2$ may indicate a virtual line passing at least one area of the second antenna module 520 and/or at least one area of the second camera module 492, and may be used hereafter with the same meaning. For example, the second virtual axis $L_2$ may be in parallel to the +x axis, but the second virtual axis $L_2$ may be a line making a specific angle with the +x axis according to an embodiment.

The second antenna module 520 may be disposed in an area corresponding to one portion of the nonconductive member 4114b, to form a beam pattern toward the rear surface of the electronic device. The second antenna module 520 may transmit an RF signal of a designated frequency band to an external electronic device, or receive an RF signal of the designated frequency band from the external electronic device. The designated frequency band may be about 28 GHz and/or about 39 GHz frequency band.

Figure 11A:
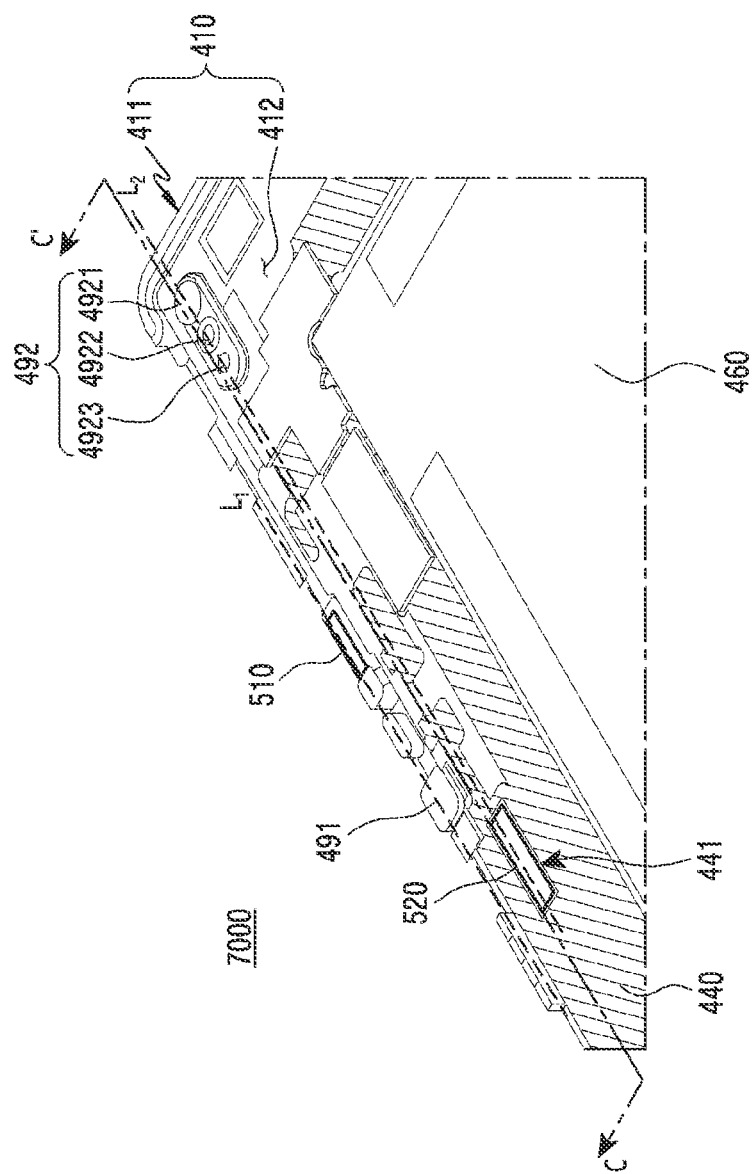
FIG. 11A illustrates an inside of an electronic device of FIG. 10, viewed from the a rear surface, according to an embodiment.
Figure 11B:
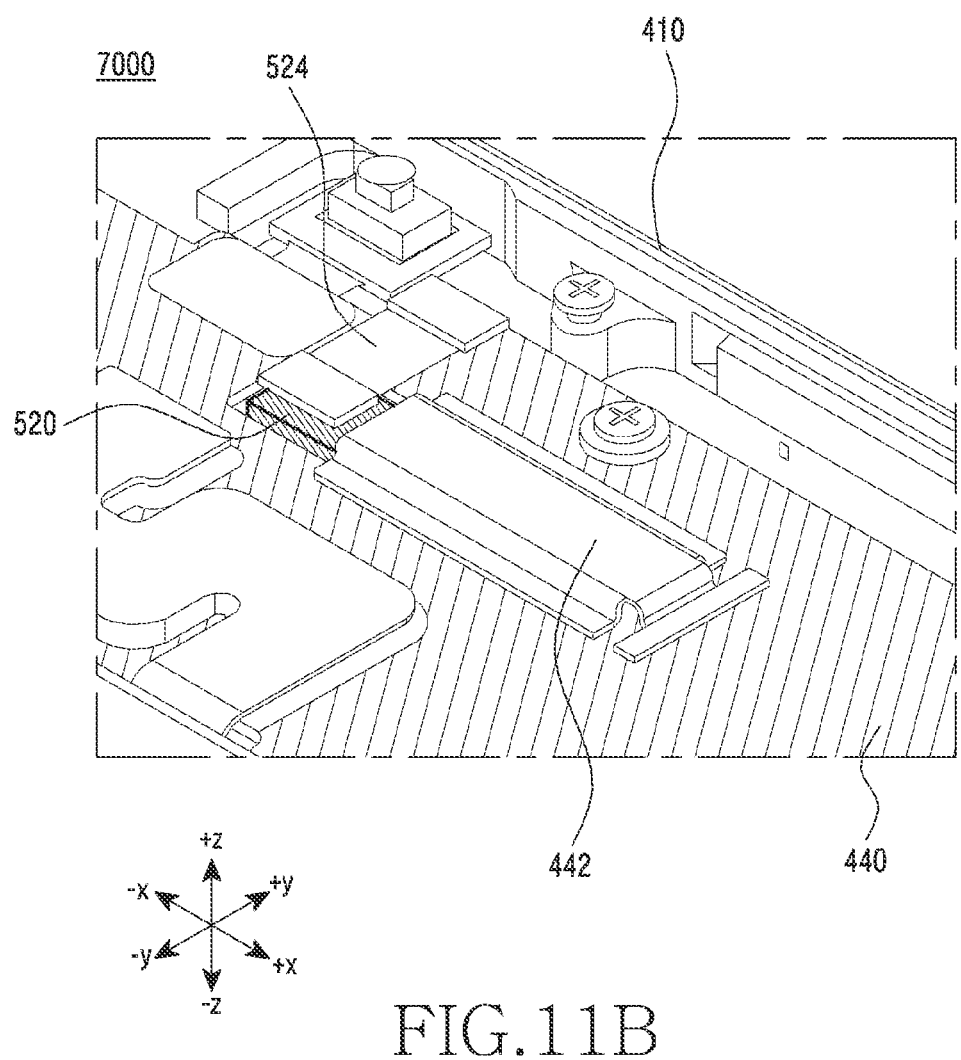
FIG. 11B illustrates a second antenna module of FIG. 11A, viewed from a front surface of the electronic device, according to an embodiment.
Figure 11C:
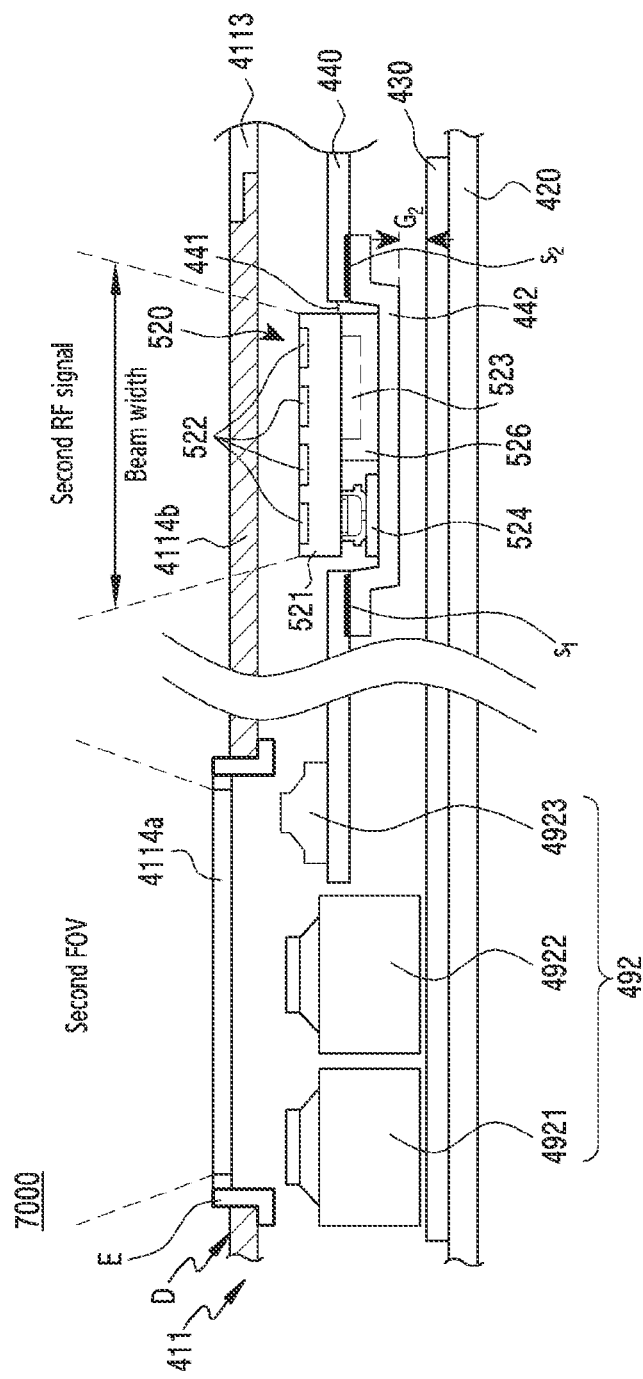
FIG. 11C illustrates a cross-sectional view of the electronic device of FIG. 11A, taken along C-C', according to an embodiment.

FIG. 11A illustrates an inside of the electronic device of FIG. 10, viewed from the rear surface, according to an embodiment, FIG. 11B illustrates a second antenna module of FIG. 11A, viewed from the front surface of the electronic device, and FIG. 11C illustrates a cross-sectional view of the electronic device of FIG. 11A, taken along C-C'. Specifically, some of the rear area of the electronic device 7000 is removed in FIG. 11A, the second antenna module 520 of FIG. 11A is viewed in the +z direction in FIG. 11B, and the second structure 412 of the frame 410 is omitted in the electronic device 7000 of FIG. 11C

Referring to FIGS. 11A, 11B, and 11C, the electronic device 7000 includes a frame 410, a cover window 420, a display 430, a PCB 440, a battery 460, a first camera module 491, a second camera module 492, a first antenna module 510, and/or a second antenna module 520. At least one of the components of the electronic device 7000 may be identical to or similar to at least one of the components of the above-described electronic devices, and redundant explanations shall be omitted.

The frame 410 includes a first structure 411 and/or a second structure 412. The first structure 411 may be formed at edges of the second structure 412, and the first structure 411 and the second structure 412 may be integrally formed. The first structure 411 of the frame 410 may form a side surface and/or a rear surface of the electronic device 411.

A surface of the first structure 411 that forms the rear surface of the electronic device 7000 may include a nonconductive area 4114 and/or a conductive area disposed to surround the nonconductive area 4114. The nonconductive area 4114 includes a window area 4114a allowing at least part of the second camera module 492 to be viewed in the rear surface of the electronic device 7000 and/or a nonconductive member 4114b extending along the +x direction based on the window area 4114a. The window area 4114a may further include a decoration member D surrounding at least part of edges of the window area 4114a and/or an enclosure E disposed between the window area 4114a and the decoration member D. The nonconductive member 4114b may be formed with a nonconductive material (e.g., a polymer), to form part of the rear surface of the electronic device 7000.

The second structure 412 of the frame 410 may include at least one electronic component. The PCB 440, the battery 460, the first camera module 491, the second camera module 492 and/or the first antenna module 510 may be disposed in one surface toward the +z direction of the second structure 412. The PCB 440 may be disposed not to overlap the battery 460 in one surface toward the +z direction of the second structure 412. The first camera module 491 and the first antenna module 510 may be aligned in the horizontal direction (e.g., the +x direction) on a first virtual axis $L_1$.

The second camera module 492 may be disposed in one area of the second structure 412 corresponding to a window area 4114a of the first structure 411. For example, when viewed from the rear surface (e.g., the −z direction) of the electronic device 7000, the second camera module 492 may be disposed to overlap at least one area of the window area 4114a. The second camera module 492 may include a 2-1 camera 4921, a 2-2 camera 4922, and/or a flash 4923. Incident light from the rear surface of the electronic device 7000 through the window area 4114a may be transmitted to the 2-1 camera 4921 and/or the 2-2 camera 4922. The 2-1 camera 4921 and/or the 2-2 camera 4922 may obtain a second FOV toward the rear surface (e.g., the −z direction of FIG. 11C) of the electronic device 7000 through the window area 4114a.

The second antenna module 520 may be disposed in one area of the PCB 440 corresponding to the nonconductive member 4114b. The second antenna module 520 may be disposed in one area of the PCB 440 overlapping the nonconductive member 4114b, when viewed from the rear surface of the electronic device 7000. At least one area of the PCB 440 corresponding to the nonconductive member 4114b may include a through hole 441, and the second antenna module 520 may be disposed inside the through hole 441.

The second antenna module 520 may be disposed in parallel with the second camera module 492. For example, the second antenna module 520 and the second camera module 492 may be aligned in the horizontal direction (e.g., the +x direction) on a second virtual axis $L_2$ passing centers of the second antenna module 520 and the second camera module 492. The PCB 440 may include a second support frame 442 disposed near the through hole 441 and supporting the second antenna module 520 in the through hole 441.

The second support frame 442 may be coupled (or secured) to one area of one surface (e.g., one surface toward the +z direction) toward the cover window 420 of the PCB 440, and support at least one area of the second antenna module 520 in the through hole 441. The second support frame 442 may be secured to the area adjacent to the through hole 441 in the one surface of the PCB 440. The second support frame 442 may surround at least part of the second antenna module 520, and support at least one area of the second antenna module 520.

The second support frame 442 may be surface-mounted on one surface toward the cover window 420 of the PCB 440. The second support frame 442 may be coupled (or soldered) to the one area (e.g., the one surface toward the +z direction) of the PCB 440 through solder pads $S_1$ and $S_2$ disposed in the one surface toward the cover window 420 of the PCB 440.

The second support frame 442 may be formed of a conductive material (e.g., a metal), to secure the second antenna module 520 and also shield noise introduced to the second antenna module 520. The solder pads $S_1$ and $S_2$ interposed between the second support frame 442 and the PCB 440 may be electrically connected to a ground of the PCB 440. As at least some area of the second support frame 442 contacts the ground of the PCB 440, the second support frame 442 may be electrically connected with the ground of the PCB 440. The second support frame 442 may operate as the ground through this electrical connection, and thus, the second support frame 442 shield the noise introduced to the second antenna module 520.

The second support frame 442 may be spaced from the display 430, which is disposed on the +z direction of the second support frame 442, by a designated distance (e.g., $G_2$ of FIG. 11C), and form a structure for radiating heat generating from the second antenna module 520. For example, excessive heat may be generated if the second antenna module 520 transmits and/or receives an RF signal of a designated frequency, and the generated heat may be transferred to the second support frame 442 formed with the conductive material. Since the second support frame 442 is spaced from the display 430 by the designated distance $G_2$, an air gap may be formed between the second support frame 442 and the display 430. The air gap generated between the second support frame 442 and the display 430 may cool the extreme heat transferred to the second support frame 442, and thus, the heat generated in operating the second antenna module 520 may be radiated.

The second support frame 442 may include a working fluid therein, and may be formed in a vapor chamber structure for radiating the heat from the second antenna module 520 using phase change of the working fluid.

The electronic device 7000 may further include a heat radiating member attached to the second support frame 442 and/or the second antenna module 520. The heat radiating member, which is interposed between the second support frame 442 and the second antenna module 520, may more effectively radiate the heat generated if the second antenna module 520 transmits and/or receives the RF signal of the designated frequency. The heat radiating member, which is formed with a nonconductive material having good radiation characteristics, may prevent leakage current generated at the second antenna module 520 from flowing to the frame 410 through the second support frame 442. The heat radiating member may include a plate formed with a good heat radiation material, a heat radiation tape, or graphite.

A recess (or a groove) may be formed in at least one area of the PCB 440 corresponding to the nonconductive member 4114*b*, and the second antenna module 520 may be disposed in the recess of the PCB 440. The second antenna module 520 may be disposed directly in at least one area (e.g., one surface toward the −z direction) of the PCB 440 corresponding to the nonconductive member 4114*b*.

The second antenna module 520 may include a second PCB 521, a second antenna array 522, and/or a second RFIC 523.

The second antenna array 522 may be disposed in the rear surface 7000 of the second PCB 521 or one surface (e.g., one surface toward the −z direction) toward the nonconductive member 4114B. The second antenna array 522 may be disposed in one surface of the second PCB 521 toward the rear surface of the electronic device 7000, operating as a radiator that forms a beam pattern toward the rear surface (e.g., the −z direction) of the electronic device 7000.

The second RFIC 523 may be disposed in the front surface of the electronic device 7000 or one surface (e.g., one surface toward the +z direction) of the second PCB 521 toward the cover window 420. The second RFIC 523 may be packaged in one surface toward of the second PCB 521 the cover window 420 by a second shield member 526, and the second shield member 526 may electromagnetically shield the second RFIC 523. The second shield member 526 may be formed with an epoxy material.

The second antenna module 520 may be electrically connected with the PCB 440 through the second FPCB 524. The second antenna module 520 may be electrically connected with wireless communication circuitry disposed on the PCB 440 through the second FPCB 524. The wireless communication circuitry may be electrically connected with the second RFIC 523 of the second antenna module 520. The wireless communication circuitry may control an angle of the beam pattern generated at the second antenna array 522, by controlling a phase and/or a frequency of an RF signal generated at the second antenna array 522.

The second antenna module 520 may generate a second RF signal toward the second antenna array 522 and/or the rear surface (e.g., the −z direction) of the electronic device 7000 through the second RFIC 523. The second antenna module 520 may generate the second RF signal toward substantially the same direction as the second FOV of the second camera module 492. If a conductive material is disposed in the radiation direction of the RF signal, the conductive material may cause radiation performance degradation of the antenna (e.g., the second antenna module 520). The electronic device 7000 may reduce the radiation performance degradation of the second antenna module 520, by disposing the nonconductive member 4114*b* formed with the nonconductive material in the beam pattern direction of the second antenna array 522.

Figure 12A:
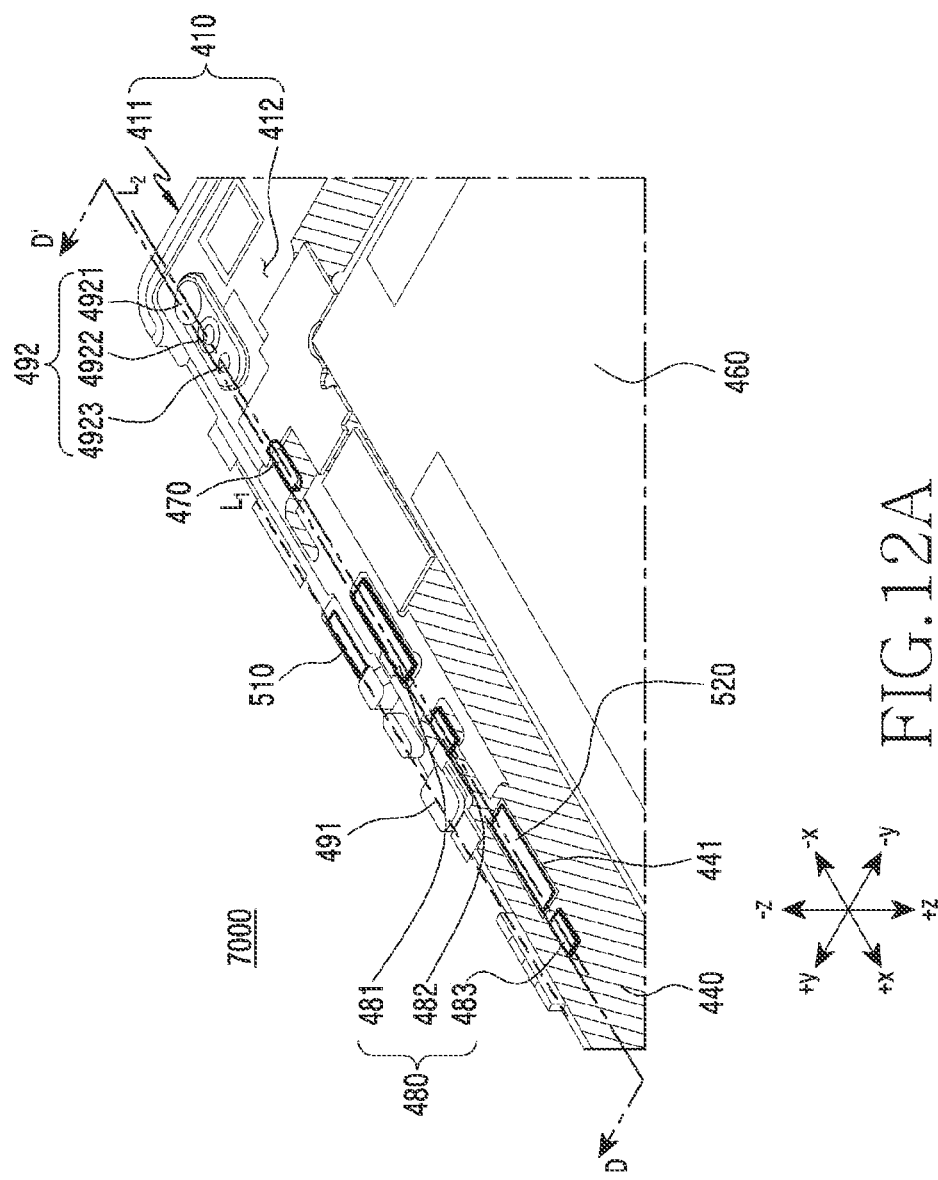
FIG. 12A illustrates an inside of the electronic device of FIG. 10, view from the rear surface, according to an embodiment.
Figure 12B:
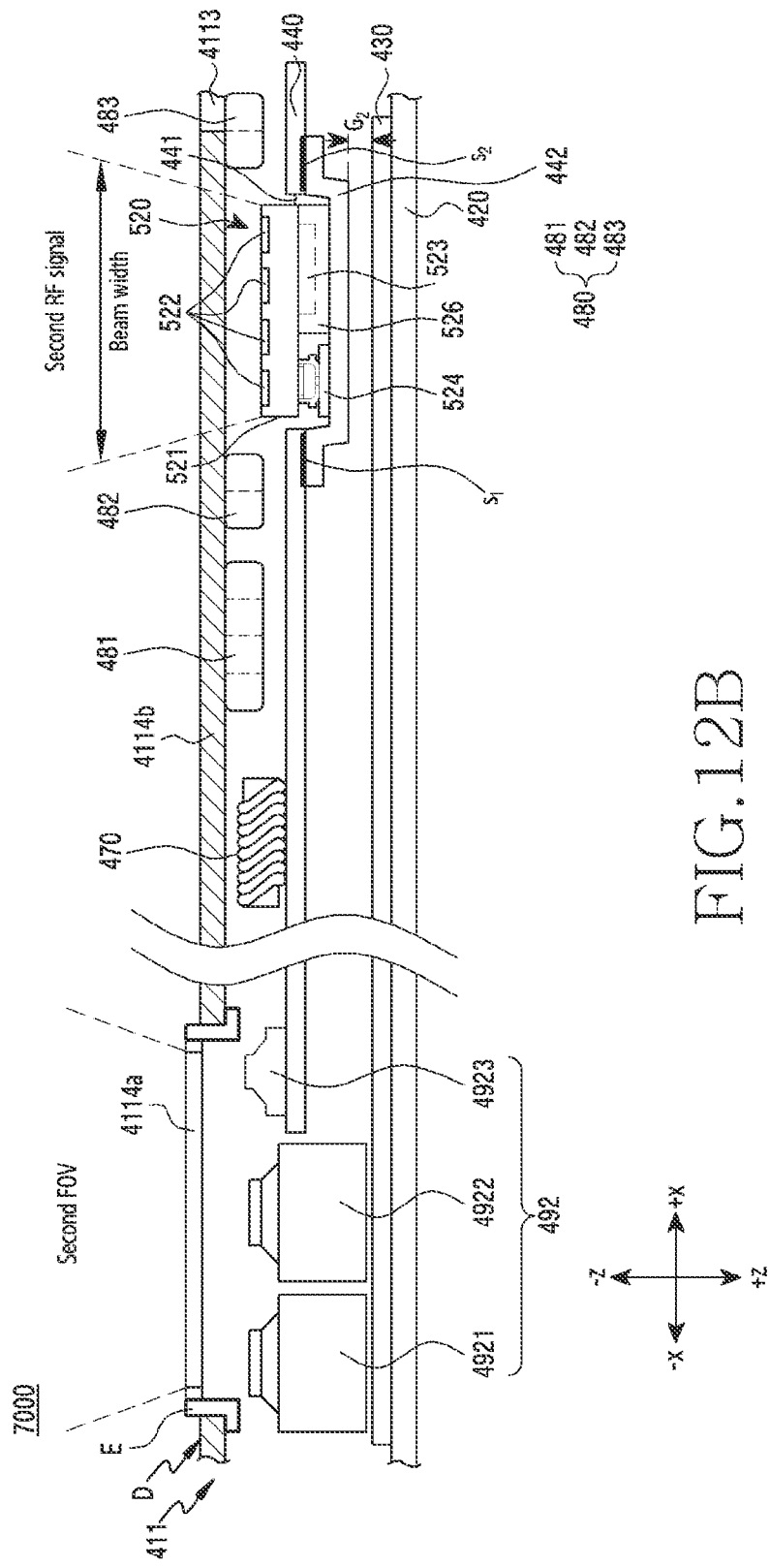
FIG. 12B illustrates a cross-sectional view of the electronic device of FIG. 12A, taken along D-D', according to an embodiment.
Figure 12C:
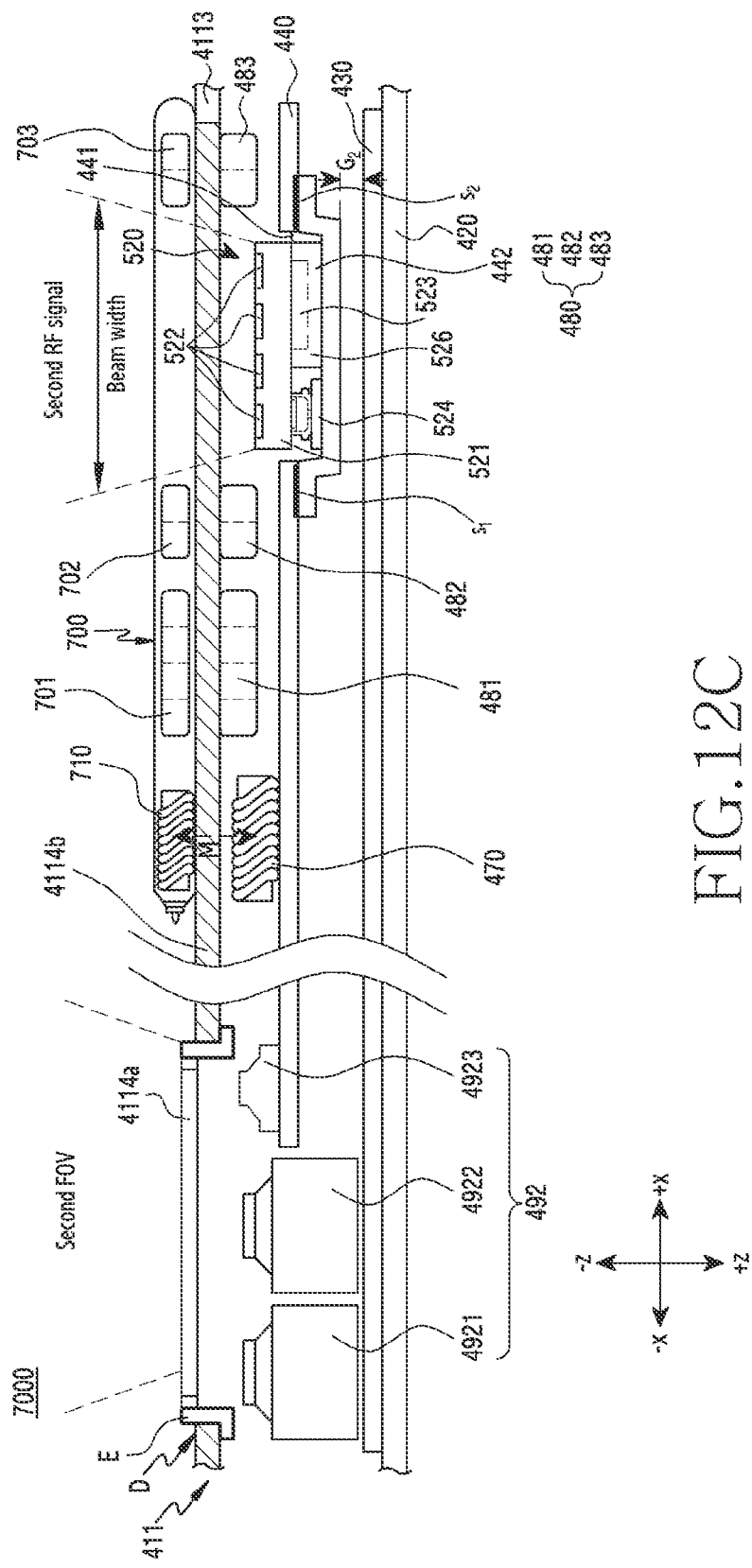
FIG. 12C illustrates a cross-sectional view of the electronic device of FIG. 12B with a stylus pen, according to an embodiment.

FIG. 12A illustrates an inside of the electronic device of FIG. 10, viewed from the rear surface, according to an embodiment, FIG. 12B illustrates a cross-sectional view of the electronic device of FIG. 12A, taken along D-D', according to an embodiment, and FIG. 12C illustrates a cross-sectional view of the electronic device of FIG. 12B with a stylus pen, according to an embodiment. Specifically, some of the rear area of the electronic device 7000 is removed in FIG. 12A, and FIG. 12B and/or FIG. 12C are the cross-sectional views of the electronic device 7000 with a second structure 412 of a frame 410 omitted.

Referring to FIGS. 12A, 12B, and 12C, the electronic device 7000 includes a frame 410, a cover window 420, a display 430, a PCB 440, a battery 460, a wireless charging coil 470, at least one magnet 480, a first camera module 491, a second camera module 492, a first antenna module 510, and/or a second antenna module 520. The electronic device 7000 in FIGS. 12A, 12B, and 12C similar to the electronic device of FIGS. 11A, 11B and/or 11C, but adds the wireless charging coil 470 and/or the at least one magnet 480. Accordingly, redundant explanations shall be omitted.

The wireless charging coil 470 and/or the at least one magnet 480 may be disposed in the rear surface of the electronic device 7000 on the PCB 440 or a surface (e.g., one surface toward the −z direction) toward a nonconductive area 4114 of the frame 410. When viewed from the rear surface of the electronic device 7000, the wireless charging coil 470 and/or the at least one magnet 480 may be disposed on the one surface of the PCB 440 overlapping a nonconductive member 4114*b* of the nonconductive area 4114. The wireless charging coil 470 and/or the at least one magnet 480 may be disposed in parallel with the second camera module 492 and the second antenna module 520 The wireless charging coil 470, the at least one magnet 480, the second camera module 492, and/or the second antenna module 520 may be aligned in the horizontal direction (e.g., the +x direction) on a second virtual axis $L_2$ passing centers of the second antenna module 520 and the second camera module 492.

Referring to FIG. 12B and FIG. 12C, the wireless charging coil 470 may be spaced from the second camera module 482 by a designated distance, and wirelessly charge an electronic component disposed on the nonconductive member 4114*b* of the rear surface of the electronic device 7000. The wireless charging coil 470 may wirelessly charge a battery of a stylus pen 700 attachable to and detachable from the nonconductive member 4114*b* of the electronic device 7000.

The wireless charging coil 470 may be electrically connected with a processor disposed on the PCB 440, and the processor may control the wireless charging coil 470. For example, a resonance signal or an induced magnetic field signal M may be generated between the electronic device 7000 and the stylus pen 700. If the stylus pen 700 is fixed in one area of the nonconductive member 4114*b* by means of magnets 701, 702, and 703 of the stylus pen 700, the electronic device 7000 may receive the resonance signal or the induced magnetic field signal M over a designated voltage (or a threshold voltage), and detect that the stylus pen 700 is attached to the nonconductive member 4114*b* based on the received signal M. If the stylus pen 700 is detached from the nonconductive member 4114*b*, the electronic device 7000 may receive the resonance signal or the induced magnetic field signal M smaller than the designated voltage (or the threshold voltage), and detect that the stylus pen 700 is detached based on the received signal M. If the stylus pen 700 is mounted (or attached) to the nonconductive member 4114*b*, the processor may data transmit and/or receive charging power and/or a communication signal including data through the wireless charging coil 470 and/or the coil 710 of the stylus pen 700. The battery in the stylus pen 700 may be wirelessly charged with the power received from the wireless charging coil 470 of the electronic device 7000.

While the wireless charging coil 470 is a wound coil of a solenoid type in FIG. 12B and FIG. 12C, the structure of the wireless charging coil 470 is not limited thereto. For example, the wireless charging coil 470 may be a coil of an FPCB type disposed on an FPCB. The wireless charging coil 470 may include a plurality of coils disposed in parallel on the FPCB. Additionally, the processor may improve charging performance, by supplying electrical currents of opposite directions to the coils disposed in parallel.

The at least one magnet 480 may be disposed in one surface (e.g., one surface toward the +z direction) toward the PCB 440 of the nonconductive member 4114b, and secure the stylus pen 700 on the rear surface of the electronic device 7000. For example, when the electronic device 7000 is viewed from the −z direction, the at least one magnet 480 may be disposed in one surface (e.g., one surface toward the +z direction) of the nonconductive member 4114b overlapping one area of the PCB 440. The at least one magnet 480 may be magnetically coupled with a magnet of the stylus pen 700, thus securing the stylus pen 700 to the nonconductive member 4114b disposed on the rear surface of the electronic device 7000. The nonconductive member 4114b may be formed with a nonmagnetic material, so as not to be affected by the at least one magnet 470.

The at least one magnet 480 may include a first magnet 481, a second magnet 482, and/or a third magnet 483. The first magnet 481, the second magnet 482, and/or the third magnet 483 may be magnetically coupled with a 1-1 magnet 701, a 2-1 magnet 702, and/or a 3-1 magnet 703 disposed in the stylus pen 700. The first magnet 481 may be disposed at a position corresponding to the 1-1 magnet 701 and magnetically coupled with the 1-1 magnet 701. The second magnet 482 may be disposed at a position corresponding to the 2-1 magnet 702 and magnetically coupled with the 2-1 magnet 702, and the third magnet 483 may be disposed at a position corresponding to the 3-1 magnet 703 and magnetically coupled with the 3-1 magnet 703. The first magnet 481 may be an array magnet disposed relatively closer to the wireless charging coil 470 than the second magnet 482 and the third magnet 483 and including a plurality of magnets. For example, the first magnet 481 may prevent the stylus pen 700 mounted in the nonconductive member 4114b of the electronic device 7000 from detaching from the nonconductive member 4114b during the wireless charging. The at least one magnet 480 is not limited to the three magnets, and the number of the at least one magnet 480 may change depending on a size of the stylus pen 700 attached to the rear surface of the electronic device 7000. For example, the at least one magnet 480 may include two magnets, or four or more magnets.

Figure 13A:
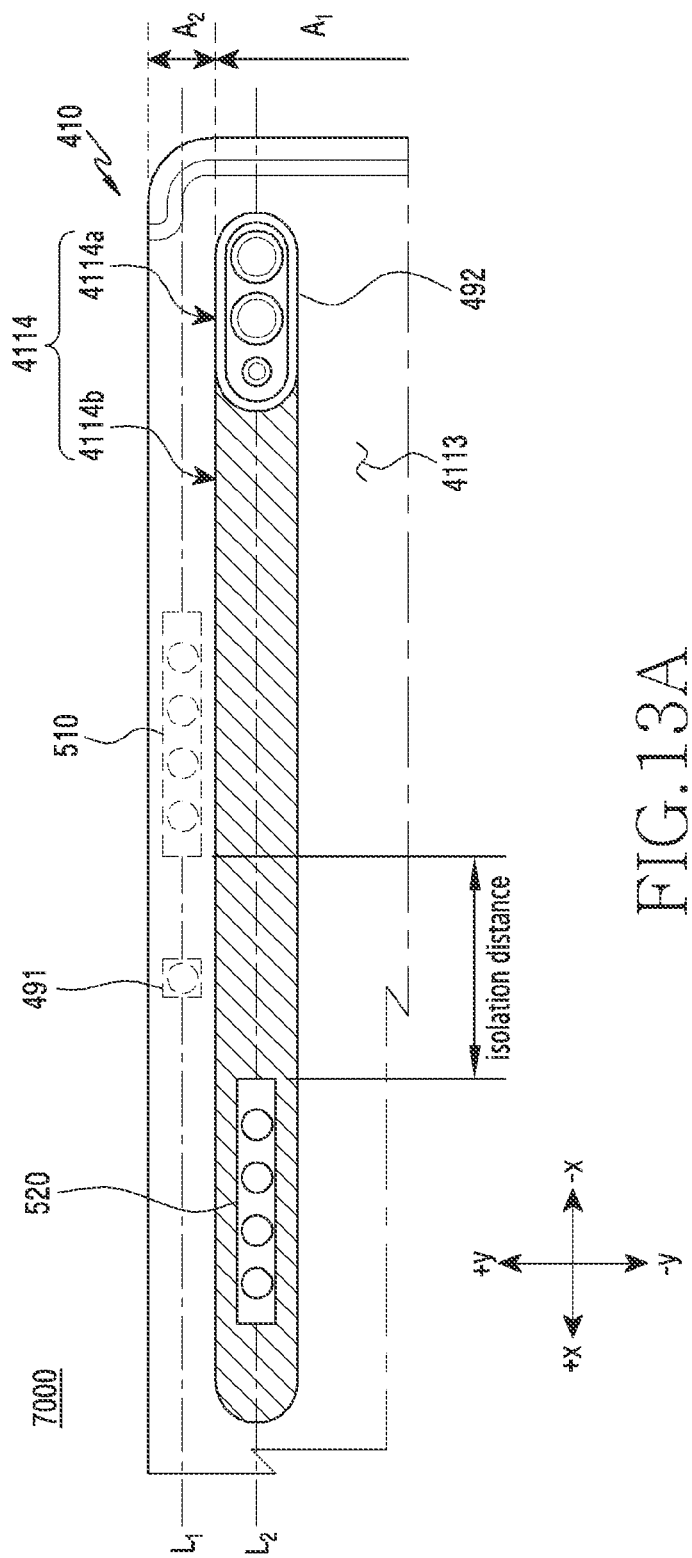
FIG. 13A illustrates an arrangement structure of a first camera, a second camera, a first antenna module and/or a second antenna module of an electronic device according to an embodiment.
Figure 13B:
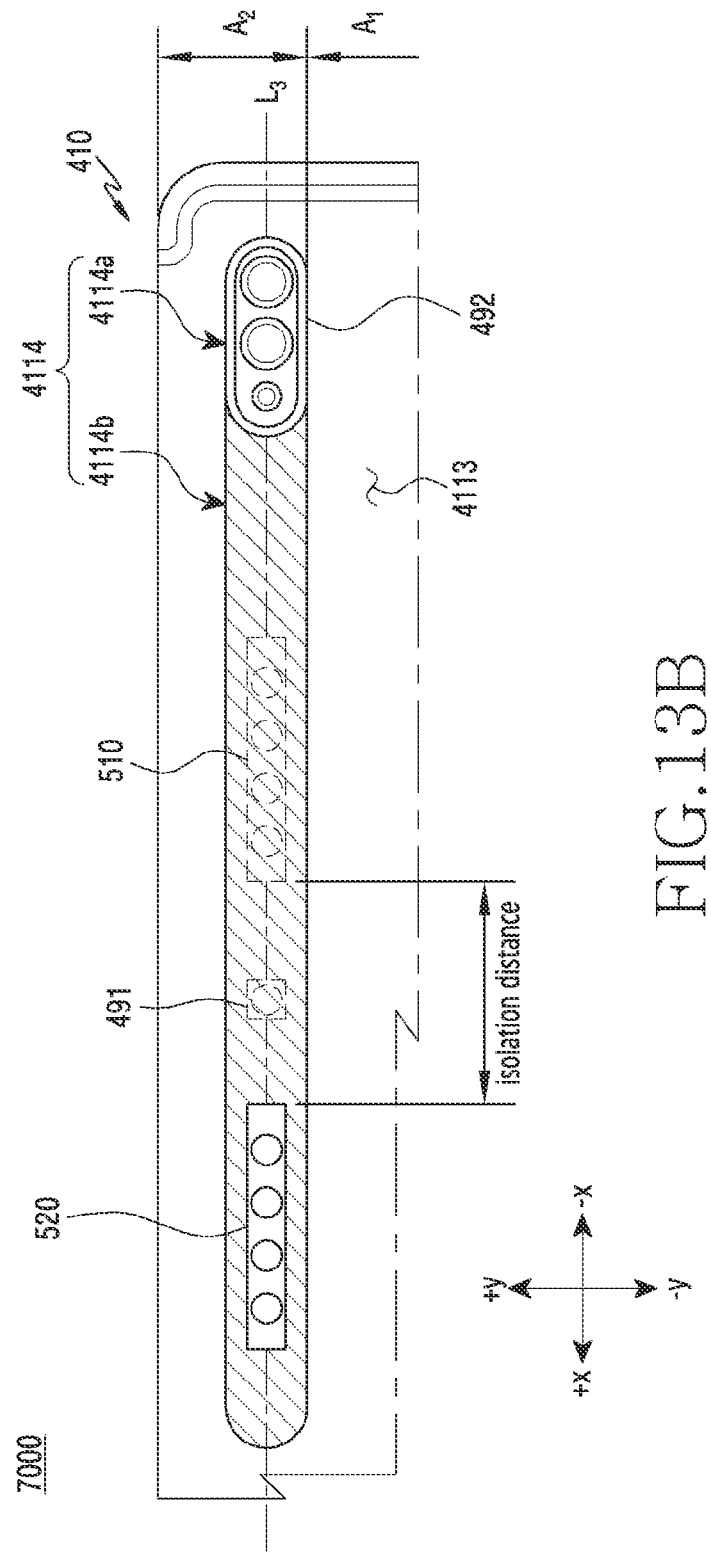
FIG. 13B illustrates an arrangement structure of a first camera, a second camera, a first antenna module and/or a second antenna module of an electronic device according to an embodiment.

FIG. 13A illustrates an arrangement structure of a first camera, a second camera, a first antenna module and a second antenna module of an electronic device according to an embodiment, and FIG. 13B illustrates an arrangement structure of the first camera, the second camera, the first antenna module, and the second antenna module of an electronic device according to an embodiment.

Referring to FIGS. 13A and 13B, the electronic device 7000 includes a frame 410, a first camera module 491, a second camera module 492, a first antenna module 510, and a second antenna module 520.

The frame 410 includes one surface that forms a rear surface of the electronic device 7000. The surface that forms the rear surface of the electronic device 7000 includes a first area $A_1$ corresponding to a VA of a cover window and a second area $A_2$ corresponding to an N-VA of the cover window.

The surface of the frame 410 includes a conductive area 4113 and/or a nonconductive area 4114. The conductive area 4113 of the frame 410 may be formed with a conductive material (e.g., a metal), and may be disposed to surround edges of the nonconductive area 4114. The nonconductive area 4114 of the frame 410 may include a window area 4114a and/or a nonconductive member 4114b extending in the +x direction based on the window area 4114a.

The nonconductive area 4114 may be disposed in the first area $A_1$ of the rear surface of the electronic device 7000, but the position of the nonconductive area 4114 is not limited thereto. For example, the nonconductive area 4114 may be disposed in the second area $A_2$ of the rear surface of the electronic device 7000.

The first camera module 491 and/or the first antenna module 510 may be disposed in at least one area corresponding to the first area $A_1$ of the electronic device 7000. The first camera module 491 and/or the first antenna module 510 may be aligned in the horizontal direction (e.g., the +x direction) on a first virtual axis $L_1$ passing centers of the first camera module 491 and/or the first antenna module 510.

The second camera module 492 and/or the second antenna module 520 may be disposed in at least one area corresponding to the nonconductive area 4114 of the electronic device 7000. For example, at least part of the second camera module 492 (e.g., a lens unit of the camera) may be disposed in an area corresponding to the window area 4114A, to be viewed from the rear surface of the electronic device 7000 through the window area 4114a. The second antenna module 520 may be spaced from the second camera module 492 by a designated distance, and disposed in the area corresponding to the nonconductive member 4114b. The second camera module 492 and/or the second antenna module 520 may be aligned in the horizontal direction (e.g., the +x direction) on a second virtual axis $L_2$ passing through the centers of the second camera module 492 and the second antenna module 520.

Referring to FIG. 13A, the first virtual axis $L_1$ on which the first camera module 491 and/or the first antenna module 510 are disposed and/or the second virtual axis $L_2$ on which the second camera module 492 and/or the second antenna module 520 may be in parallel. The first virtual axis $L_1$ may be extended along a first direction (e.g., the +x direction) in the second area $A_2$ of the rear surface of the electronic device 7000, and the second virtual axis $L_2$ may be extended along the same first direction as the first virtual axis $L_1$ in the first area $A_1$ of the rear surface of the electronic device 7000.

If the user grips an edge of the electronic device 7000, radiation performance of an antenna (e.g., the first antenna module 510) disposed close to the edge of the electronic device 7000 may be degraded. The electronic device 7000 may include the first antenna module 510 in the second area $A_2$ relatively close to the edge of the electronic device 7000, and the second antenna module 520 in the first area $A_1$ relatively spaced from the edge of the electronic device 7000, thus reducing the radiation performance degradation if the user grips the electronic device 7000.

Referring to FIG. 13B, the first camera module 491, the second camera module 492, the first antenna module 510, and/or the second antenna module 520 may be aligned in the horizontal direction on a third virtual axis $L_3$. The third virtual axis $L_3$ may indicate a virtual line which passes through one area of the first camera module 491, one area of the second camera module 492, one area of the first antenna module 510, and/or one area of the second antenna module 520, in parallel with the +x axis. The first camera module 491, the second camera module 492, the first antenna module 510, and/or the second antenna module 520 may be disposed on the third virtual axis $L_3$ in the second area $A_2$ of the rear surface of the electronic device 7000.

Because the first camera module 491 and the first antenna module 510 are aligned in the horizontal direction or the second camera module 492 and the second antenna module 520 are aligned in the horizontal direction, a mounting space may be obtained in the electronic device 7000. The electronic device 7000 may improve the performance (e.g., the radiation performance) of the first antenna module 510 and/or the second antenna module 520, by adjusting the size of the antenna array of the first antenna module 510 and/or the second antenna module 520, increasing the number of the antenna arrays, or changing the arrangement of the antenna array.

If the first antenna module 510 and the second antenna module 520 are disposed in proximity, interference may occur between a first RF signal radiated from the first antenna module 510 and a second RF signal radiated from the second antenna module 520, and thus the radiation performance of the first antenna module 510 and/or the second antenna module 520 may be degraded.

By mounting the first camera module 491 between the first antenna module 510 and the second antenna module 520, the electronic device 7000 may obtain an isolation distance for isolation between the first antenna module 510 and the second antenna module 520. The first antenna module 510 is spaced from the second antenna module 520 by about 40 mm, and thus, the isolation between the first antenna module 510 and the second antenna module 520 may be attained. The distance between the first antenna module 510 and the second antenna module 520 is not limited thereto, and the first antenna module 510 may be spaced by about 20 mm or about 90 mm or more.

The first camera module 491, the first antenna module 510, and the second camera module 492 may be disposed in order in the −x direction based on the second antenna module 520. In accordance with this structure, the electronic device 7000 may obtain the isolation between the first antenna module 510 and the second antenna module 520, thus reducing the radiation performance degradation of the first antenna module 510 and/or the second antenna module 520.

Figure 14:
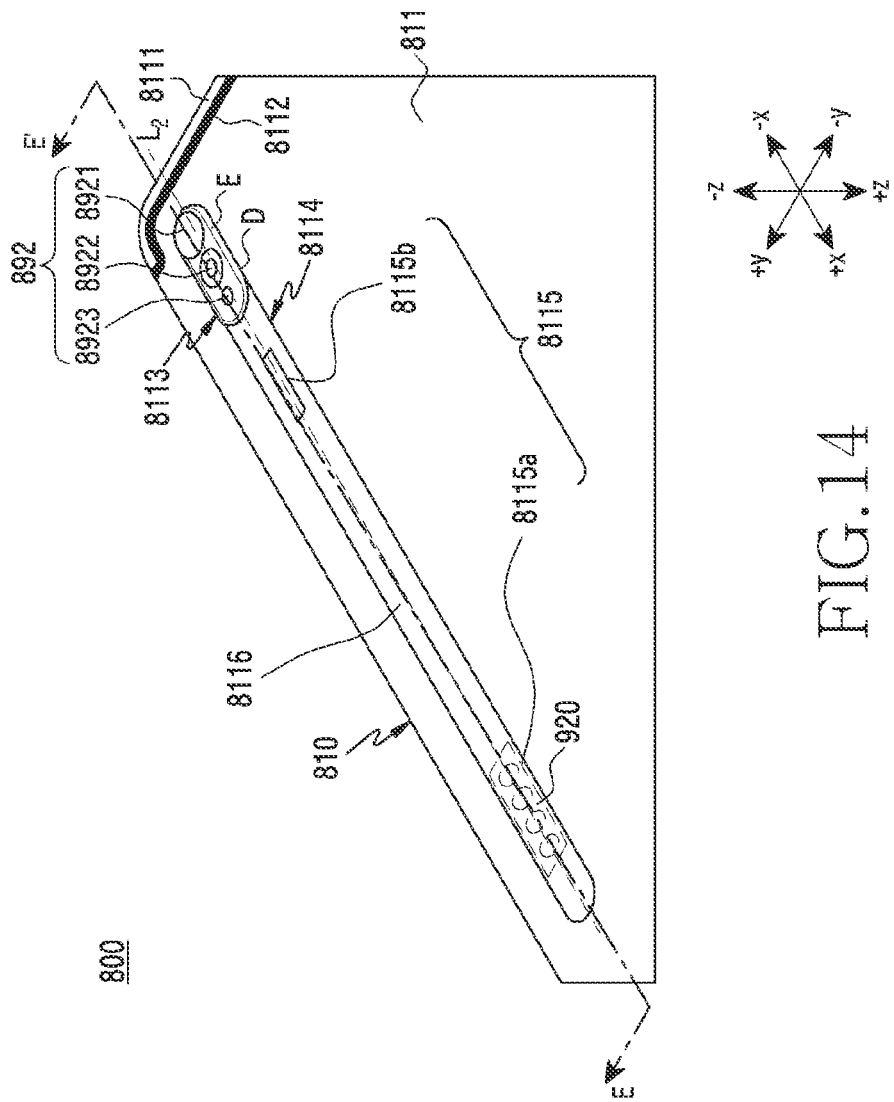
FIG. 14 illustrates a rear surface of an electronic device according to an embodiment.

FIG. 14 illustrates a rear surface of an electronic device according to an embodiment.

Referring to FIG. 14, an electronic device 800 includes a frame 810, a nonconductive plate 8116, a second camera module 892, and/or a second antenna module 920. The electronic device 800 has different rear surface structure than the electronic devices described above.

The frame 810 includes a first structure 811, which forms a side surface, and/or a rear surface of the electronic device 800. At least one surface of the first surface 811 that forms the side surface of the electronic device 800 may include a plurality of conductive portions 8111 and/or a plurality of nonconductive portions 8112 for insulating the conductive portions 8111. The conductive portions 8111 and/or the nonconductive portions 8112 may be disposed on a left area (e.g., in the +x direction) and/or a right area (e.g., in the −x direction) of the electronic device 800. Alternatively, the conductive portions 8111 of the first structure 811 may be electrically connected with wireless communication circuitry disposed on a PCB and/or a ground of the PCB. The conductive portions 8111 may operate as an antenna radiator (e.g., an IFA) for transmitting and/or receiving an RF signal of a designated frequency band using the electrical connection.

A surface of the first structure 811 that forms the rear surface of the electronic device 800 includes a window area 8113 and/or a recess 8114. The window area 8113 may be formed at a position corresponding to at least part of the second camera module 892 and formed with at least partially view material, and at least part of the second camera module 892 may be visually exposed in the rear surface of the electronic device 800. The window area 8113 may further include a decoration member D disposed to surround edges of the window area 8113. The recess 8114 may be formed by recessing one area of the rear surface of the electronic device 800 close to the window area 8113 in the +z direction. For example, the recess 8114 may be extended in the +x direction based on the window area 8113.

At least one slot 8115 may be formed in one surface (e.g., one surface toward the −z direction) of the recess 8114. The at least one slot 8115 may include a first slot 81115 and/or a second slot 8115$b$ spaced from the first slot 8115$a$. The first slot 8115$a$ may be formed at a position corresponding to the second antenna module 920 of the electronic device 800. The second slot 8155$b$ may be formed at a position corresponding to a wireless charging coil of the electronic device 800. The at least one slot 8115 including the first slot 8115$a$ and/or the second slot 8115$b$ is merely one example, and the number of the slots of the at least one slot 8115 is not limited thereto.

The nonconductive plate 8116 may be formed with a glass material, and disposed within the recess 8114. The nonconductive plate 8116 may be disposed within the recess 8114, to form at least part of the rear surface of the electronic device 800. The nonconductive plate 8116 may be attached to the recess 8114 using an adhesive or an adhesive member. The nonconductive plate 8116 may be formed opaquely, and the at least one slot 8115 of the recess 8114 may not be visible in the rear surface of the electronic device 800 due to the opaque nonconductive plate 8116.

The second camera module 892 may be disposed in an area corresponding to the window area 8113 of the electronic device 800. For example, when viewed from the rear surface of the electronic device 800, at least one area of the second camera module 892 may be disposed to overlap the window area 8113. The second camera module 892 may include a 2-1 camera 8921, a 2-2 camera 8922, and/or a flash 8923. At least part of the 2-1 camera 8921, the 2-2 camera 8922, and/or the flash 8923 (e.g., some area of lens portions of the 2-1 camera 8921 and the 2-2 camera 8922 and/or the flash 8923) may be visually exposed in the rear surface of the electronic device 800 through the window area 8113.

The second antenna module 920 may be disposed in one area corresponding the at least one slot 8115 of the electronic device 800. For example, when viewed from the rear surface of the electronic device 800, the second antenna module 920 may be disposed to overlap the at least one slot 8115 in at least one area. The second antenna module 920 may be spaced from the second camera module 892. The second antenna module 920 and the second camera module 892 may be aligned in the horizontal direction (e.g., the +x direction) on a second virtual axis $L_2$. The second virtual axis $L_2$ may indicate a virtual line passing one area of the second antenna module 920 and/or one area of the second camera module 892. The second virtual axis $L_2$ may indicate an axis in parallel to the +x axis.

The second antenna module 920 may be disposed at a position corresponding to the at least one slot 8115, to form a beam pattern toward the rear surface of the electronic device 800. The second antenna module 920 may transmit an RF signal of a designated frequency band to an external electronic device, or receive an RF signal of the designated frequency band from the external electronic device. The designated frequency band may be about 28 GHz and/or about 39 GHz frequency band.

Figure 15A:
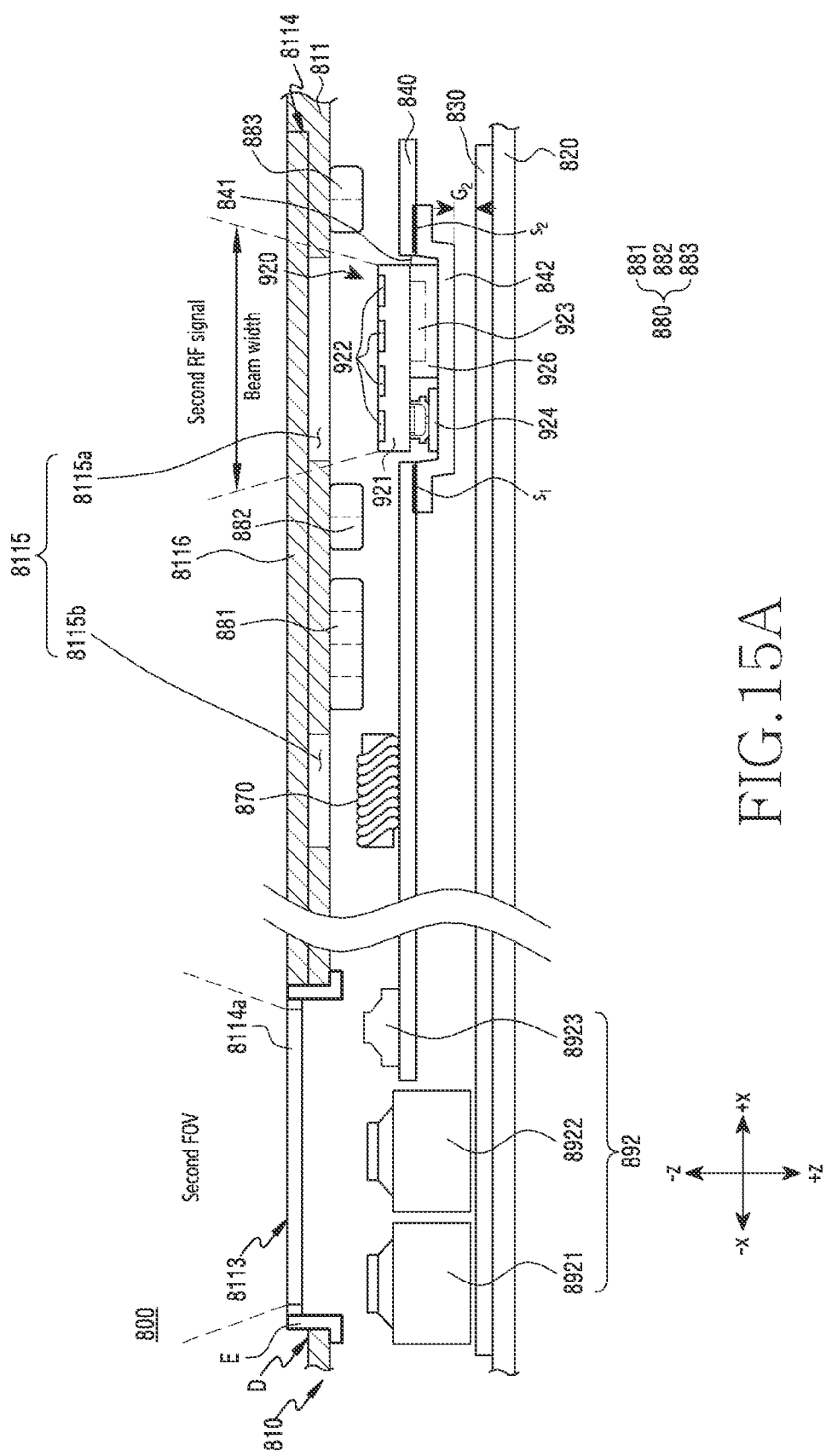
FIG. 15A illustrates a cross-sectional view of the electronic device of FIG. 14, taken along E-E', according to an embodiment.
Figure 15B:
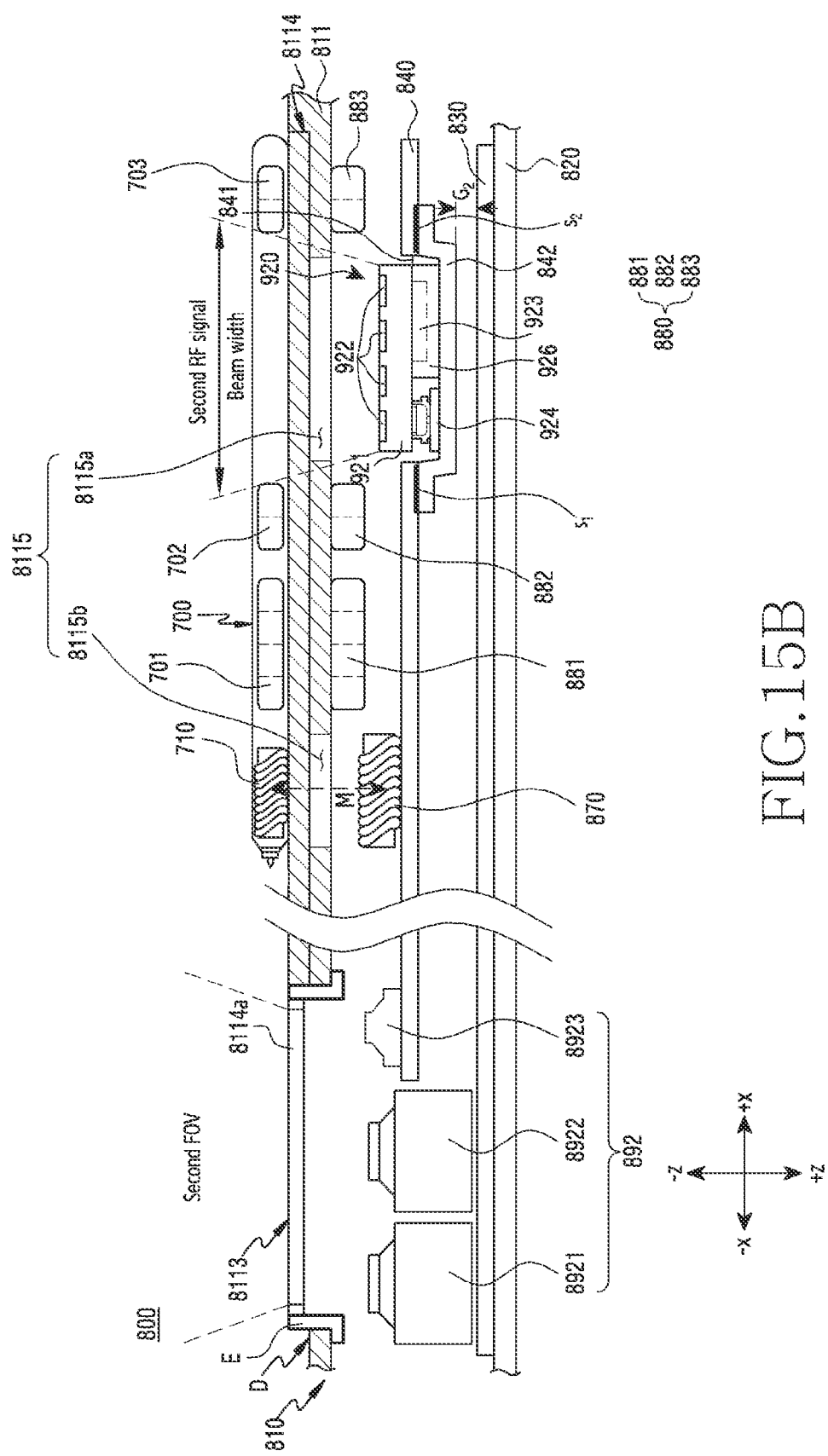
FIG. 15B illustrates a cross-sectional view of the electronic device of FIG. 15A with a stylus pen, according to an embodiment.

FIG. 15A illustrates a cross-sectional view of the electronic device of FIG. 14, taken along E-E', according to an embodiment, and FIG. 15B illustrates a cross-sectional view of the electronic device of FIG. 15A with a stylus pen, according to an embodiment. Specifically, FIGS. 15A and 15B illustrate cross-sectional views of the electronic device 800 with a second structure of a frame 810 omitted.

Referring to FIGS. 15A and 15B, the electronic device 800 includes a frame 810, a cover window 820, a display 830, a PCB 840, a wireless charging coil 870, at least one magnet 880, a second camera module 892, and a second antenna module 920.

The frame 810 includes a first structure 811 that forms a side surface and/or a rear surface of the electronic device 800. A surface of the first surface 811 that forms the rear surface of the electronic device 800 may include a window area 8113 and/or a recess 8114. The window area 8113 may be formed at a position corresponding to at least part of the second camera module 892 and formed with at least partially transparent material, and at least one part of the second camera module 892 may be visually exposed in the rear surface of the electronic device 800. The window area 8113 may further include a decoration member D disposed to surround at least some edge of the window area 8113 and/or an enclosure E disposed between the window area 8113 and the decoration member D. The recess 8114 may be formed by recessing one area of the rear surface of the electronic device 800 close to the window area 8113 in the +z direction. For example, the recess 8114 may be extended in the +x direction based on the window area 8113.

At least one slot 8115 may be formed in one surface (e.g., one surface toward the −z direction) of the recess 8114. The at least one slot 8115 includes a first slot 81115 and/or a second slot 8115b spaced from the first slot 8115a. The first slot 8115a may be formed at a position corresponding to the second antenna module 920 on the PCB 840. The second slot 8115b may be formed at a position corresponding to the wireless charging coil 870 on the PCB 840. The at least one slot 8115 including the first slot 8115a and/or the second slot 8115b is merely an example, and the number of the slots of the at least one slot 8115 is not limited thereto.

The nonconductive plate 8116 may be formed with a glass material, and disposed within the recess 8114. For example, the nonconductive plate 8116 may be disposed within the recess 8114, to form at least part of the rear surface of the electronic device 800. The at least one slot 8115 in the recess 8114 may not be visible in the rear surface of the electronic device 800.

The wireless charging coil 870 and/or the at least one magnet 880 may be disposed in the rear surface of the electronic device 800 of the PCB 840 or one surface toward the nonconductive plate 8116. The wireless charging coil 870 and/or the at least one magnet 880 may be disposed in one surface of the PCB 440 overlapping the nonconductive plate 8116, when viewed from the rear surface of the electronic device 800. The wireless charging coil 870 and/or the at least one magnet 880 may be disposed in parallel with the second camera module 892 and the second antenna module 920. For example, the wireless charging coil 870, the at least one magnet 880, the second camera module 892, and/or the second antenna module 920 may be aligned in the horizontal direction (e.g., the +x direction) on a second virtual axis $L_2$ passing through the centers of the second antenna module 920 and the second camera module 892.

The wireless charging coil 870 may be spaced from the second camera module 892 by a designated distance, and wirelessly charge an electronic component disposed on the nonconductive plate 8116 of the rear surface of the electronic device 800. For example, the wireless charging coil 870 may wirelessly charge a battery of a stylus pen 700 attachable to and detachable from the nonconductive plate 8116 of the electronic device 800.

The wireless charging coil 870 may be electrically connected with a processor disposed on the PCB 840, and the processor may control the wireless charging coil 870. For example, a resonance signal or an induced magnetic field signal M may be generated between the electronic device 800 and the stylus pen 700. If the stylus pen 700 is secured in one area of the nonconductive member 4114b by using the magnets 701, 702 and 703 of the stylus pen 700, the electronic device 800 may receive the resonance signal or the induced magnetic field signal M over a designated voltage (or a threshold voltage), and detect that the stylus pen 700 is attached to the nonconductive plate 8116 based on the received signal M. If the stylus pen 700 is detached from the nonconductive plate 8116, the electronic device 800 may receive the resonance signal or the induced magnetic field signal M smaller than the designated voltage (or the threshold voltage), and detect that the stylus pen 700 is detached based on the received signal M. If the stylus pen 700 is mounted (or attached) to the nonconductive member 4114b, the processor may transmit and/or receive charging power and/or a communication signal including data through the wireless charging coil 870 and/or a coil 710 of the stylus pen 700. The battery in the stylus pen 700 may be wirelessly charged with the power received from the wireless charging coil 870 of the electronic device 800. While the wireless charging coil 870 is a wound coil of a solenoid type in FIG. 15A and/or FIG. 15B, the structure of the wireless charging coil 870 is not limited thereto. For example, the wireless charging coil 870 may be a coil of an FPCB type disposed on an FPCB. The wireless charging coil 870 may include a plurality of coils disposed in parallel on the FPCB. The processor may improve charging performance by supplying electrical currents of opposite directions to the coils disposed in parallel.

The at least one magnet 880 may be disposed in one surface (e.g., one surface toward the +z direction) toward the PCB 840 of the nonconductive plate 8116, and secure the stylus pen 700 on the rear surface of the electronic device 800. The at least one magnet 880 may be magnetically coupled with a magnet of the stylus pen 700, thus securing the stylus pen 700 to the nonconductive plate 8116 disposed on the rear surface of the electronic device 800. The nonconductive plate 8116 may be formed with a nonmagnetic material, which is not affected by the at least one magnet 880.

The at least one magnet 880 may include a first magnet 881, a second magnet 882 and/or a third magnet 883. The first magnet 881, the second magnet 882, and/or the third magnet 883 may be magnetically coupled with a 1-1 magnet 701, a 2-1 magnet 702, and/or a 3-1 magnet 703 disposed in the stylus pen 700. The first magnet 881 may be disposed at a position corresponding to the 1-1 magnet 701 and magnetically coupled with the 1-1 magnet 701. The second magnet 882 may be disposed at a position corresponding to the 2-1 magnet 702 and magnetically coupled with the 2-1 magnet 702, and the third magnet 883 may be disposed at a position corresponding to the 3-1 magnet 703 and magnetically coupled with the 3-1 magnet 703. The first magnet 881 may be an array magnet disposed relatively closer to the wireless charging coil 870 than the second magnet 882 and the third magnet 883, and including a plurality of magnets. The first magnet 881 may prevent the stylus pen 700 mounted on the nonconductive plate 8116 of the electronic device 800 from detaching from the nonconductive plate 8116 in the wireless charging.

The at least one magnet 880 is not limited to the three magnets, and the number of the at least one magnet 880 may change depending on a size of the stylus pen 700 attached to the rear surface of the electronic device 800. For example, the at least one magnet 880 may include two magnets, or four or more magnets.

The second camera module 892 may be disposed in an area of the electronic device 800 corresponding to a window area 8113. When viewed from a rear surface (e.g., in the −z direction) of the electronic device 800, the second camera module 892 may be disposed to overlap at least one area of the window area 8113. The second camera module 892 may include a 2-1 camera 8921, a 2-2 camera 8922, and/or a flash 8923. Incident light from the rear surface of the electronic device 800 through the window area 8113 may be transmitted to the 2-1 camera 8921 and/or the 2-2 camera 8922. For example, the 2-1 camera 8921 and/or the 2-2 camera 8922 may obtain a second FOV toward the rear surface (e.g., the −z direction) of the electronic device 800 through the window area 8113.

The second antenna module 920 may be disposed in one area of the PCB 840 corresponding to a first slot 8115*a*. The second antenna module 920 may be disposed in one area of the PCB 840 overlapping the first slot 8115*a*, when viewed from the rear surface of the electronic device 800. At least one area of the PCB 840 corresponding to the first slot 8115*a* may include a through hole 841, and the second antenna module 920 may be disposed inside the through hole 841. The second antenna module 920 may be disposed in parallel with the second camera module 892. The second antenna module 920 and the second camera module 892 may be aligned in the horizontal direction (e.g., the +x direction) on a second virtual axis $L_2$ passing through the centers of the second antenna module 920 and the second camera module 892.

The PCB 840 may include a second support frame 842 disposed near the through hole 841 and supporting the second antenna module 920 in the through hole 841.

The second support frame 442 may be coupled (or secured) to one area of one surface (e.g., one surface toward the +z direction) toward the cover window 820 of the PCB 840, and support at least one area of the second antenna module 920 in the through hole 841. The second support frame 842 may be secured to the area adjacent to the through hole 841 of the one surface of the PCB 840. The second support frame 842 may surround at least part of the second antenna module 920, and support at least one area of the second antenna module 920. The second support frame 842 may be surface-mounted on the one surface toward the cover window 820 of the PCB 840. The second support frame 842 may be coupled (or soldered) to the one area (e.g., the one surface toward the +z direction) of the PCB 840 through solder pads $S_1$ and $S_2$ disposed in one surface toward the cover window 820 of the PCB 840.

The second support frame 842 may be formed of a conductive material (e.g., a metal), in order to secure the second antenna module 920 and to shield noise introduced to the second antenna module 920. The solder pads $S_1$ and $S_2$ interposed between the second support frame 842 and the PCB 840 may be electrically connected to a ground of the PCB 840. As at least some area of the second support frame 842 contacts the ground of the PCB 840, the second support frame 842 may be electrically connected with the ground of the PCB 840. The second support frame 842 may operate as the ground through this electrical connection, and thus, the second support frame 842 may shield the noise introduced to the second antenna module 920.

The second support frame 842 may be spaced from the display 830 that is disposed on the +z direction of the second support frame 842, by a designated distance (e.g., $G_2$ of FIG. 15C), thereby forming a structure for radiating heat generating at the second antenna module 920. Excessive heat may be generated if the second antenna module 920 transmits and/or receives an RF signal of a designated frequency, and the generated heat may be transferred to the second support frame 842 formed with the conductive material. Since the second support frame 842 is spaced from the display 830 by the designated distance $G_2$, an air gap may be formed between the second support frame 842 and the display 830. The air gap generated between the second support frame 842 and the display 830 may cool the extreme heat transferred to the second support frame 842, and thus, the extreme heat generating in operating the second antenna module 920 may be radiated.

The electronic device 800 may further include a heat radiating member attached to the second support frame 842 and/or the second antenna module 920. The heat radiating member, which is interposed between the second support frame 842 and the second antenna module 920, may radiate the heat generated if the second antenna module 920 transmits and/or receives the RF signal of the designated frequency. The heat radiating member may be formed with a nonconductive material having good heat radiation characteristics, and may prevent leakage current generated at the second antenna module 920 from flowing to the frame 810 through the second support frame 842. The heat radiating member may include at least one of a plate formed with a material having good heat radiation characteristics, a heat radiation tape or graphite.

The second antenna module 920 may include a second PCB 921, a second antenna array 922, and/or a second RFIC 923.

The second antenna array 922 may be disposed in one surface (e.g., one surface toward the −z direction) toward the rear surface of the second PCB 921 or the nonconductive member 8114*b*. The second antenna array 922 may be disposed in one surface toward the rear surface of the electronic device 800 of the second PCB 921, in order to operate as a radiator which forms a beam pattern toward the rear surface (e.g., the −z direction) of the electronic device 800.

The second RFIC 923 may be disposed on one surface (e.g., one surface toward the +z direction) of the second PCB 921, toward the front surface of the electronic device 800 or the cover window 820. The second RFIC 923 may be packaged in one surface toward the cover window 820 of the second PCB 921 by a second shield member 926, and the second shield member 926 may electromagnetically shield the second RFIC 923. The second shield member 926 may be formed with an epoxy material.

The second antenna module 920 may be electrically connected with the PCB 840 through a second FPCB 924. The second antenna module 920 may be electrically connected with wireless communication circuitry disposed on the PCB 840 through the second FPCB 924. The wireless communication circuitry may be electrically connected with the second RFIC 923 of the second antenna module 920. The wireless communication circuitry may control an angle of the beam pattern generated at the second antenna array 922 by controlling a phase and/or a frequency of the RF signal generated at the second antenna array 922.

The second antenna module 920 may generate a second RF signal toward the second antenna array 922 and/or the rear surface (e.g., the +z direction) of the electronic device 800 through the second RFIC 923. The second antenna module 920 may generate the second RF signal toward substantially the same direction as the second FOV of the second camera module 892. If a conductive material is disposed in the radiation direction of the RF signal, the conductive material may cause radiation performance degradation of the antenna. The electronic device 800 may reduce the radiation performance degradation of the second antenna module 920 by including the first slot 8115*a* and the nonconductive plate 8116 formed with the nonconductive material in the beam pattern direction of the second antenna array 922.

An electronic device according to an embodiment may include a cover window for forming a front surface of the electronic device, the cover window including a view area and a non-view area formed along edges of the view area, a view portion formed in at least one area of the non-view area, a frame including a first structure which forms a sides surface and a rear surface of the electronic device, and a second structure which at least one electronic component is disposed, the first structure of the frame including one surface which forms the rear surface of the electronic device, the one surface including a nonconductive area which includes a window area and a conductive area which surrounds the nonconductive area, a display visually exposed to outside of the electronic device through the view area of the cover window, a printed circuit board disposed in the second structure, wireless communication circuitry disposed on the printed circuit board, a first camera disposed in a first area of the second structure corresponding to the view portion, and facing the cover window, a second camera disposed in a second area of the second structure corresponding to the window area, and facing the rear surface of the electronic device, a first antenna module electrically connected with the wireless communication circuitry, and configured to generate a first RF signal toward the cover window, and a second antenna module electrically connected with the wireless communication circuitry, and configured to generate a second RF signal toward the rear surface of the electronic device, wherein the first antenna module and the first camera may be aligned on a first axis, and the second antenna module and the second camera may be aligned on a second axis.

The first antenna module may include a first substrate, and a first antenna array disposed in one surface toward the cover window of the first substrate, and includes a plurality of antenna elements for transmitting and receiving an RF signal of a designated frequency band.

The second antenna module may include a second substrate, and a second antenna array disposed in one surface of the second substrate toward the rear surface of the electronic device, and including a plurality of antenna elements for transmitting and receiving an RF signal of a designated frequency band.

According to one embodiment, the frame may further include a support structure for protruding from at least one area of the second structure toward the cover window, and receiving the first antenna, wherein the support structure may include a body portion, and a protruding portion disposed on at least one edge of the body portion, and protruding from the body portion toward the cover window.

The support structure may further include an insulating member disposed in at least one area of one surface of the body portion toward the cover window and at least one area of an inner side surface of the protruding portion.

The first antenna module may be disposed within a recess which is formed by the body portion and the protruding portion of the support structure.

The first antenna module may be formed to have a first height based on the body portion, and the protruding portion may be formed with a second height lower than the first height based on the body portion.

The electronic device may further include a first support frame interposed between the first antenna module and the insulating member, and contacting at least one area of the first antenna module to radiate heat generated from the first antenna module, wherein a gap may be formed between the first support frame and the insulating member.

The printed circuit board may further include a through hole formed in an area corresponding to at least one area of the nonconductive area, and the second antenna module may be disposed inside the through hole of the printed circuit board.

The printed circuit board may further include a second support frame secured to at least one area of the printed circuit board close to the through hole, and supporting the second antenna module disposed in the through hole.

The second support frame may contact at least one area of the second antenna module, and radiate heat generated from the second antenna module.

The first camera may be interposed between the first antenna module and the second antenna module, when viewed from the front surface of the electronic device.

The electronic device may further include a stylus pen attached to or detached from at least one area of the nonconductive area of the first structure.

The electronic device may further include at least one magnet disposed in an area corresponding to the nonconductive area, and attaching the stylus pen to at least one area of the rear surface of the electronic device.

The electronic device may further include a wireless charging coil disposed in an area corresponding to the nonconductive area, of one surface toward the rear surface of the printed circuit board, and wirelessly charging the stylus pen.

An electronic device according to an embodiment of the disclosure may include a cover window for forming a front surface of the electronic device, the cover window including a view area and a non-view area formed along edges of the view area, a view portion formed in at least one area of the non-view area, a frame including a first structure which forms a sides surface and a rear surface of the electronic device and a second structure which at least one electronic component is disposed, the first structure of the frame including one surface which forms the rear surface of the electronic device, the one surface including a window area and a recess including at least one slot, a nonconductive plate disposed in the recess and forming at least part of the rear surface of the electronic device, a display visually exposed to outside of the electronic device through the view area of the cover window, a printed circuit board disposed in the second structure, wireless communication circuitry disposed on the printed circuit board, a first camera disposed in a first area of the second structure corresponding to the view portion, and facing the cover window, a second camera disposed in a second area of the second structure corresponding to the window area, and facing the rear surface of the electronic device, a first antenna module electrically connected with the wireless communication circuitry, and configured to generate a first RF signal toward the cover window, and a second antenna module electrically connected with the wireless communication circuitry, and configured to generate a second RF signal toward the rear surface of the electronic device, wherein the first antenna module and the first camera may be aligned on a first axis, and the second antenna module and the second camera may be aligned on a second axis.

The at least one slot may include a first slot and a second slot spaced from the first slot.

The printed circuit board may further include a through hole formed in an area corresponding to the first slot, of the printed circuit board, and a second support frame secured to at least one area of the printed circuit board close to the through hole, and supporting the second antenna module disposed in the through hole.

The electronic device may further include a wireless charging coil disposed in one surface of the printed circuit board, toward the rear surface of the electronic device, and wirelessly charging a stylus pen attached to or detached from the rear surface of the electronic device.

The wireless charging coil may be disposed in an area corresponding to the second slot of the one surface of the printed circuit board.

An electronic device according to the above-described embodiments of the disclosure may provide a mounting structure of a mmWave antenna in the electronic device of which a side surface and a rear surface are integrally formed.

An electronic device according to the above-described embodiments of the disclosure may generate a beam pattern by avoiding a conductive member that forms a side surface of the electronic device, and thus improves antenna performance (e.g., antenna gain).

In the above-described embodiments of the disclosure, the elements included in the disclosure are expressed in a singular or plural form according to the suggested specific embodiment. However, the singular or plural expression is appropriately selected according to a proposed situation for the convenience of explanations, the disclosure is not limited to a single element or a plurality of elements, the elements expressed in the plural form may be configured as a single element, and the elements expressed in the singular form may be configured as a plurality of elements.

While the disclosure has been particularly shown and described with reference to certain embodiments thereof, it will be understood by those of ordinary skill in the art that various changes in form and details may be made therein without departing from the spirit and scope of the disclosure as defined by the following claims and their equivalents.

What is claimed is:

1. An electronic device, comprising:
    a cover window that forms a front surface of the electronic device, the cover window comprising a view area and a non-view area formed along edges of the view area, and a view portion formed in at least one area of the nor-view area;
    a frame comprising a first structure that forms a sides surface and a rear surface of the electronic device, and a second structure on which at least one electronic component is disposed, the first structure including a surface that forms the rear surface of the electronic device, the surface including a nonconductive area that includes a window area and a recess comprising at least one slot, and a conductive area that surrounds the nonconductive area;
    a nonconductive plate disposed in the recess and forming at least part of the rear surface of the electronic device;
    a display visually exposed to outside of the electronic device through the view area of the cover window;
    a printed circuit board (PCB) disposed in the second structure;
    a wireless Communication circuitry disposed on the printed circuit board;
    a first camera disposed in a first area of the second structure corresponding to the view portion, and facing the cover window;
    a second camera disposed in a second area of the second structure corresponding to the window area, and facing the rear surface of the electronic device;
    a first antenna module electrically connected with the wireless communication circuitry, and configured to generate a first radio frequency (RF) signal toward the cover window; and
    a second antenna module electrically connected with the wireless communication circuitry, and configured to generate a second RF signal toward the rear surface of the electronic device,
    wherein the first antenna module and the first camera are aligned on a first axis, and wherein the second antenna module and the second camera are aligned on a second axis.

2. The electronic device of claim 1, wherein the first antenna module comprises:
    a first substrate; and
    a first antenna array disposed in one surface toward the cover window of the first substrate, the first antenna array including a plurality of antenna elements configured to transmit and receive an RF signal of a designated frequency band.

3. The electronic device of claim 1, wherein the second antenna module comprises:
    a second substrate; and
    a second antenna array disposed in one surface of the second substrate toward the rear surface of the electronic device, the second antenna array including a plurality of antenna elements configured to transmit and receive an RF signal of a designated frequency band.

4. The electronic device of claim 1, wherein the frame further comprises a support structure protruding from at least one area of the second structure toward the cover window, and receiving the first antenna, and
    wherein the support structure comprises:
        a body portion; and
        a protruding portion disposed on at least one edge of the body portion, and protruding from the body portion toward the cover window.

5. The electronic device of claim 4, wherein the support structure further comprises an insulating member disposed in at least one area of one surface of the body portion toward the cover window and at least one area of an inner side surface of the protruding portion.

6. The electronic device of claim 5, wherein the first antenna module is disposed within a recess formed by the body portion and the protruding portion of the support structure.

7. The electronic device of claim 5, wherein the first antenna module has a first height based on the body portion, and
    wherein the protruding portion is formed with a second height lower than the first height based on the body portion.

8. The electronic device of claim 5, further comprising a first support frame interposed between the first antenna module and the insulating member, and contacting at least one area of the first antenna module to radiate heat generated from the first antenna module, wherein a gap is formed between the first support frame and the insulating member.

9. The electronic device of claim 1, wherein the PCB further comprises a through hole formed in an area corresponding to at least one area of the nonconductive area, and wherein the second antenna module is disposed inside the through hole of the PCB.

10. The electronic device of claim 9, wherein the PCB further comprises a second support frame secured to at least one area of the PCB that is close to the through hole, and supporting the second antenna module disposed in the through hole.

11. The electronic device of claim 10, wherein the second support frame contacts at least one area of the second antenna module, and radiates heat generated from the second antenna module.

12. The electronic device of claim 1, wherein the first camera is interposed between the first antenna module and the second antenna module, when viewed from the front surface of the electronic device.

13. The electronic device of claim 1, further comprising a stylus pen configured to be attached to or detached from at least one area of the nonconductive area of the first structure.

14. The electronic device of claim 13, further comprising at least one magnet disposed in an area corresponding to the nonconductive area, and attaching the stylus pen to at least one area of the rear surface of the electronic device.

15. The electronic device of claim 13, further comprising a wireless charging coil disposed in an area corresponding to the nonconductive area of one surface toward the rear surface of the PCB, and wirelessly charging the stylus pen.

16. An electronic device, comprising:

a cover window that forms a front surface of the electronic device, the cover window comprising a view area and a non-view area formed along edges of the view area, and a view portion formed in at least one area of the non-view area;

a frame comprising a first structure that forms a side surface and a rear surface of the electronic device, and a second structure on which at least one electronic component is disposed, the first structure of the frame including one surface that forms the rear surface of the electronic device, the one surface including a window area and a recess comprising at least one slot;

a nonconductive plate disposed in the recess and forming at least part of the rear surface of the electronic device;

a display visually exposed to outside of the electronic device through the view area of the cover window;

a printed circuit board (PCB) disposed in the second structure;

wireless communication circuitry disposed on the printed circuit board;

a first camera disposed in a first area of the second structure corresponding to the view portion, and facing the cover window;

a second camera disposed in a second area of the second structure corresponding to the window area, and facing the rear surface of the electronic device;

a first antenna module electrically connected with the wireless communication circuitry, and configured to generate a first radio frequency (RF) signal toward the cover window; and a second antenna module electrically connected with the wireless communication circuitry, and configured to generate a second RF signal toward the rear surface of the electronic device, wherein the first antenna module and the first camera are aligned on a first axis, and wherein the second antenna module and the second camera are aligned on a second axis.

17. The electronic device of claim 16, wherein the at least one slot comprises a first slot and a second slot spaced from the first slot.

18. The electronic device of claim 17, wherein the PCB further comprises:

a through hole formed in an area corresponding to the first slot of the PCB; and a second support frame secured to at least one area of the PCB close to the through hole, and supporting the second antenna module disposed in the through hole.

19. The electronic device of claim 17, further comprising a wireless charging coil disposed in one surface of the PCB, toward the rear surface of the electronic device, and wirelessly charging a stylus pen attached to or detached from the rear surface of the electronic device.

20. The electronic device of claim 19, wherein the wireless charging coil is disposed in an area corresponding to the second slot of the one surface of the PCB.

* * * * *

UNITED STATES PATENT AND TRADEMARK OFFICE
CERTIFICATE OF CORRECTION

| | | |
|---|---|---|
| PATENT NO. | : 11,527,814 B2 | Page 1 of 1 |
| APPLICATION NO. | : 17/333243 | |
| DATED | : December 13, 2022 | |
| INVENTOR(S) | : Junhee Han et al. | |

It is certified that error appears in the above-identified patent and that said Letters Patent is hereby corrected as shown below:

In the Claims

In Column 43, Line 56 of Claim 1:
"nor-view area;"
Should be:
-- non-view area; --.

In Column 44, Line 5 of Claim 1:
"a wireless Communication circuitry disposed on the"
Should be:
-- wireless communication circuitry disposed on the --.

Signed and Sealed this
Twenty-third Day of May, 2023

Katherine Kelly Vidal
*Director of the United States Patent and Trademark Office*